United States Patent
Fujishita

(10) Patent No.: US 8,854,649 B2
(45) Date of Patent: Oct. 7, 2014

(54) NON-TRANSITORY COMPUTER-READABLE MEDIUM STORING INFORMATION PROCESSING PROGRAM, INFORMATION PROCESSING APPARATUS, AND INFORMATION PROCESSING METHOD

(71) Applicant: Masahiro Fujishita, Nagoya (JP)

(72) Inventor: Masahiro Fujishita, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/180,802

(22) Filed: Feb. 14, 2014

(65) Prior Publication Data
US 2014/0253937 A1     Sep. 11, 2014

(30) Foreign Application Priority Data
Mar. 7, 2013   (JP) ................................. 2013-045622

(51) Int. Cl.
*G06F 15/00* (2006.01)

(52) U.S. Cl.
USPC ....................................................... 358/1.13

(58) Field of Classification Search
USPC ....................................................... 358/1.13
See application file for complete search history.

(56) References Cited

U.S. PATENT DOCUMENTS 5,859,956 A * 1/1999 Sugiyama et al. ........... 358/1.13
2002/0071689 A1 6/2002 Miyamoto

FOREIGN PATENT DOCUMENTS

| JP | 2002-182529 A | 6/2002 |
| JP | 2006-236033 A | 9/2006 |

* cited by examiner

*Primary Examiner* — Saeid Ebrahimi dehKordy
(74) *Attorney, Agent, or Firm* — Scully, Scott, Murphy & Presser, P.C.

(57) ABSTRACT

A medium stores computer-executable instructions. The instructions cause a control unit of an information processing apparatus to: display a setting screen on which setting values for a plurality of setting items are to be set respectively, the plurality of setting items including a first setting item which has one of an enabled state and a disabled state as a first setting value and a second setting item which has a setting value group, which is associated with the second setting item and which includes a plurality of setting values settable for the second setting item; display, on the setting screen, a first sub setting value group in a case that the first setting value is the enabled state; and display, on the setting screen, a second sub setting value group in a case that the first setting value is the disabled state.

12 Claims, 17 Drawing Sheets

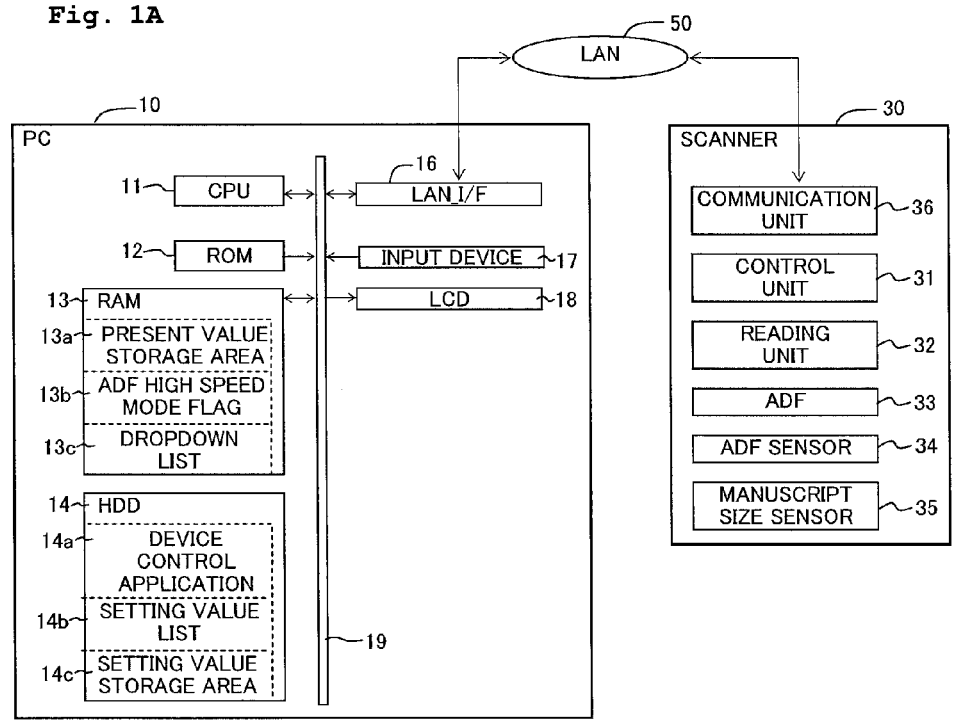

FIRST EMBODIMENT
(PROCESSING EXECUTED BY CPU)

FIRST EMBODIMENT
(PROCESSING EXECUTED BY CPU)

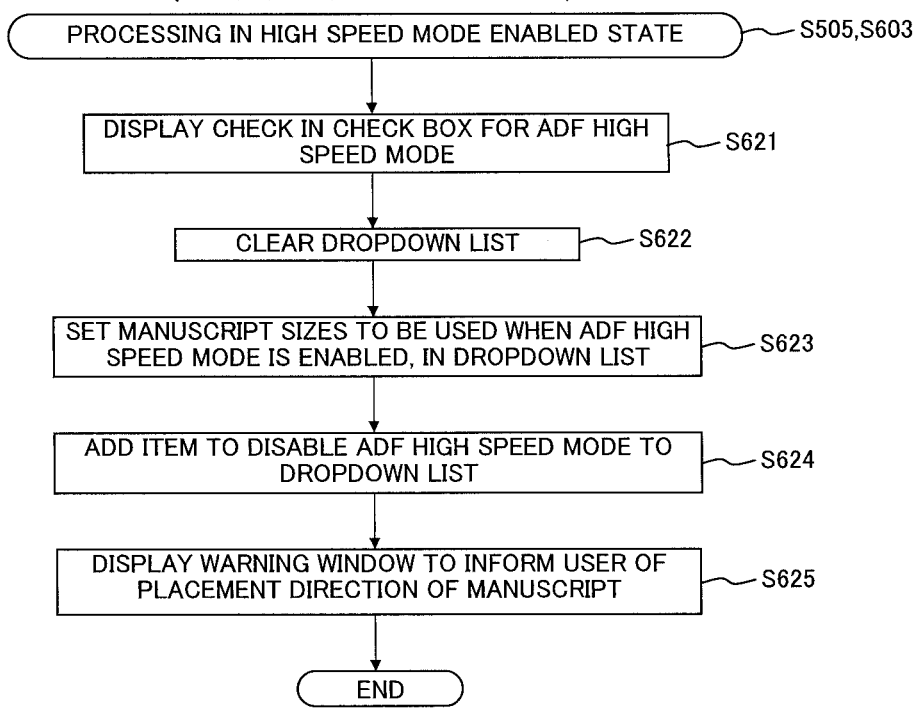

FIRST EMBODIMENT
(PROCESSING EXECUTED BY CPU)

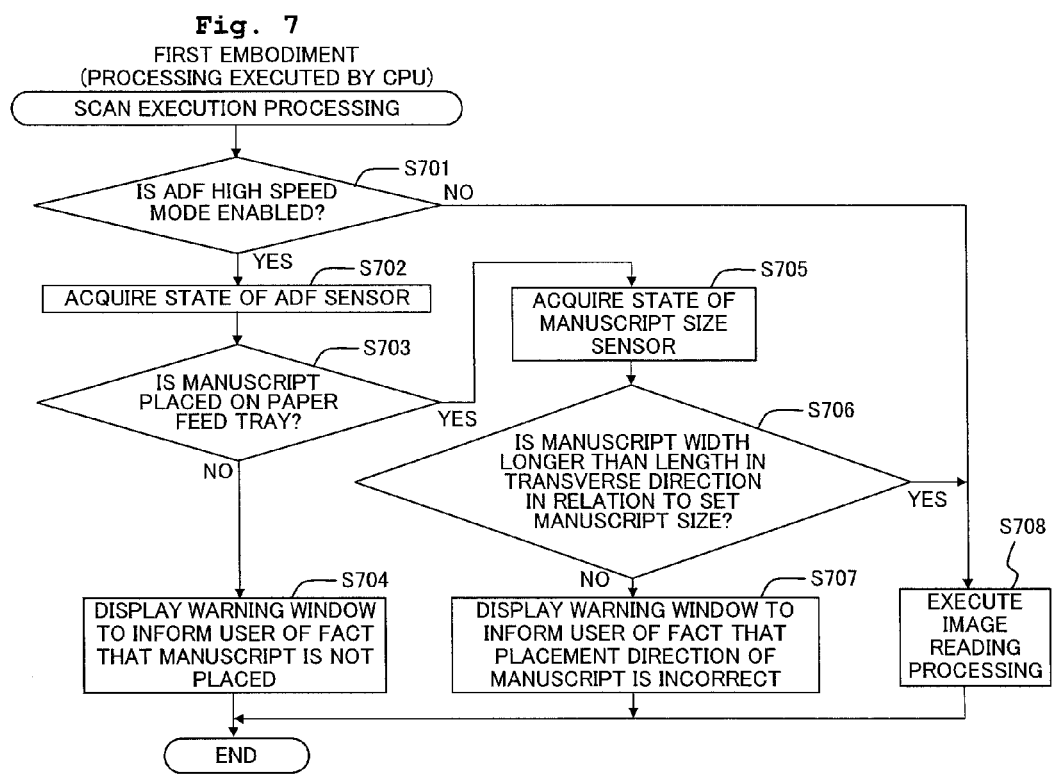

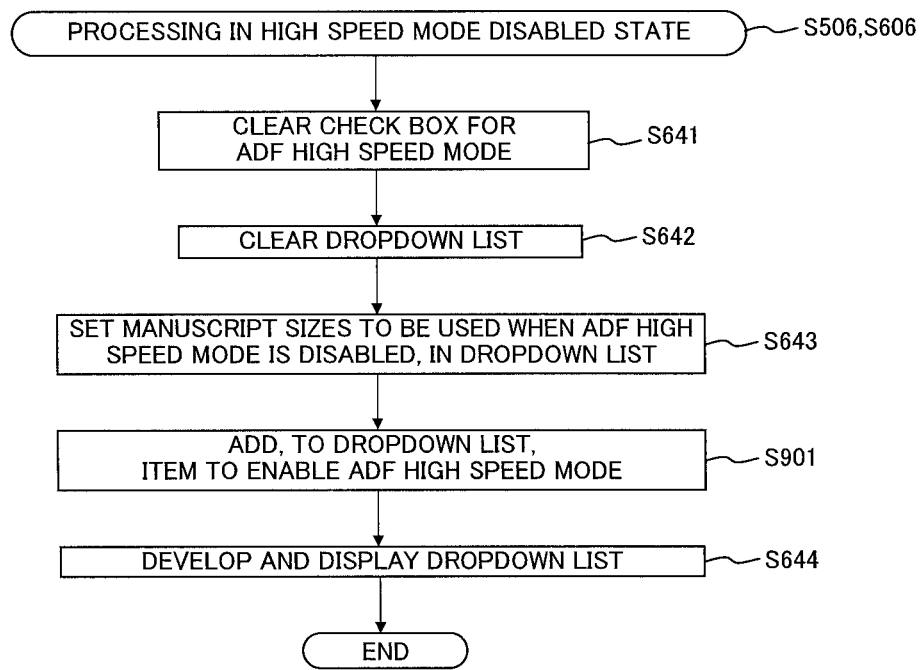

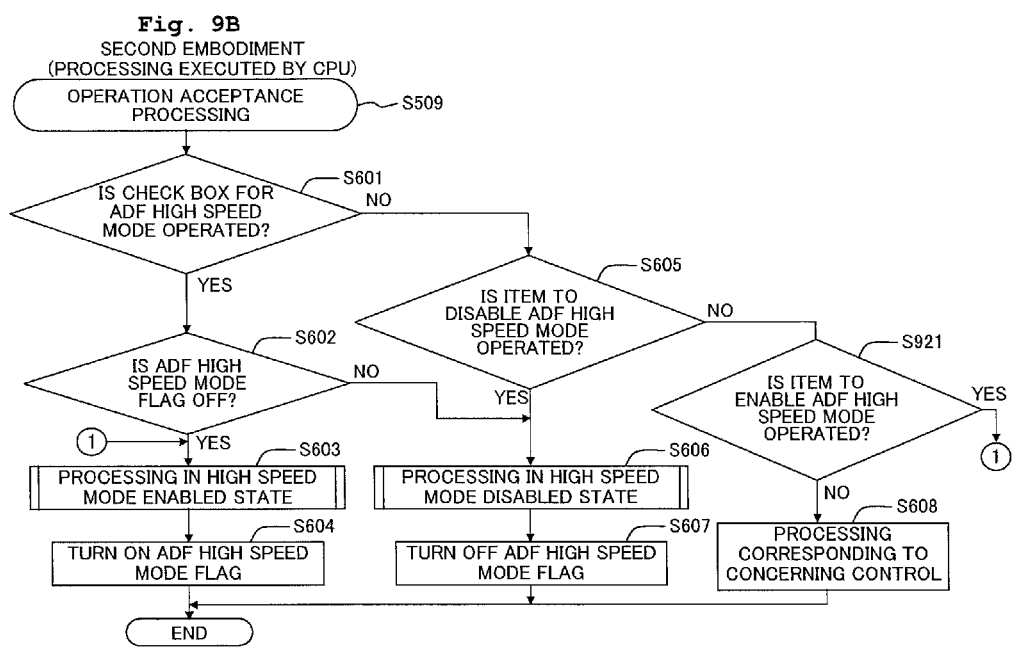

NON-TRANSITORY COMPUTER-READABLE MEDIUM STORING INFORMATION PROCESSING PROGRAM, INFORMATION PROCESSING APPARATUS, AND INFORMATION PROCESSING METHOD The present application claims priority from Japanese Patent Application No. 2013-045622, filed on Mar. 7, 2013, the disclosure of which is incorporated herein by reference in its entirety.

BACKGROUND OF THE INVENTION

1. Field of the Invention

The present invention relates to a medium storing an information processing program, an information processing apparatus, and an information processing method.

2. Description of the Related Art

Japanese Patent Application Laid-open No. 2006-236033 discloses a printing system wherein all names of manuscript sizes of a manuscript size matrix of an objective type of machine are displayed as a manuscript size display list if the "borderless print" check box is not checked on a printing setting screen of a printer driver, while only names of manuscript sizes included in the manuscript size matrix for which the borderless print is executable are displayed as a manuscript size display list if the "borderless print" check box is checked.

According to the printing system described in Japanese Patent Application Laid-open No. 2006-236033, any manuscript size name, which is included in the manuscript size names capable of being used in the objective type of machine and which is not displayed on the manuscript size display list, cannot be selected by a user so long as the state, in which the "borderless print" check box is checked, is given. Therefore, even if the user desires the setting of the manuscript size for which the borderless print is not executable in the state in which the "borderless print" check box is checked, such a situation may arise that it is impossible to select the desired manuscript size name. In such a situation, if the user does not recognize that the manuscript size names included in the manuscript size display list can be changed by performing the operation for disabling the check of the "borderless print" check box, it is difficult for the user to display the desired manuscript size name on the manuscript size display list and select the concerning manuscript size name. It is noted that the occurrence of the problem as described above is not limited to the situation in which the choices (alternatives or options) of the manuscript size names displayed on the manuscript size display list are changed depending on the setting of the borderless print, but the problem as described above may also arise in such a situation that the choices of setting values for a setting item are changed depending on a setting value for a predetermined setting item which is different from the setting item and in relation to a process or processing executable by an image forming apparatus.

SUMMARY OF THE INVENTION

The present invention has been made taking the foregoing circumstances into consideration, an object of which is to provide an information processing program, an information processing apparatus, and an information processing method which make it possible to improve the operability when various settings are performed for a concerning processing, in such a situation that the choices of setting values for a setting item are changed depending on a setting value for a predetermined setting item which is different from the setting item and in relation to (associated with) a process or processing executable by an image forming apparatus.

According to an aspect of the present invention, there is provided a non-transitory computer-readable medium storing computer-executable instructions that, when executed by a processor, cause a control unit of an information processing apparatus provided with a storage unit and configured to be communicable with an image forming apparatus and a display unit to: display, on the display unit, a setting screen on which setting values for a plurality of setting items are to be set respectively, the plurality of setting items being associated with a predetermined processing to be executed by the image forming apparatus and including a first setting item which has one of an enabled state and a disabled state as a first setting value and a second setting item which has a setting value group, which is associated with the second setting item and stored in the storage unit and which includes a plurality of setting values settable for the second setting item; display, on the setting screen, a first sub setting value group which is included in the setting value group and which includes a setting value settable for the second setting item under a condition that the first setting value is the enabled state, in a case that the first setting value is the enabled state; display, on the setting screen, a second sub setting value group in a case that the first setting value is the disabled state, the second sub setting value group being included in the setting value group, and including at least one setting value which is settable for the second setting item under a condition that the first setting value is the disabled state and which is not settable for the second setting item under a condition that the first setting value is the enabled state; enable an acceptance of an input to a first switching designator for switching the first setting value from the enabled state to the disabled state, in the case that the first setting value is the enabled state; and disable the acceptance of the input to the first switching designator, in the case that the first setting value is the disabled state.

The present invention can be constructed in various forms of, for example, an information processing apparatus, a control apparatus for controlling the information processing apparatus, an information processing system, an information processing method, and a recording medium for recording the information processing program.

According to the aspect of the present invention as described above, if the first setting value is the enabled state for the first setting item of the plurality of setting items in relation to the predetermined processing to be executed by the image forming apparatus, then the acceptance is enabled for the input with respect to the first switching designator in order to switch the first setting value from the enabled state to the disabled state, while if the first setting value is the disabled state, then the acceptance is disabled for the input with respect to the first switching designator. Therefore, the user can recognize that the setting of the first setting item can be switched from the enabled state to the disabled state depending on whether or not the input can be made with respect to the first switching designator. When the user switches the first setting value for the first setting item from the enabled state to the disabled state, the user can thereby easily display, as the choice (alternative or option) on the setting screen, the setting value incapable of being set if the first setting value is the enabled state, of the plurality of setting values capable of being set for the second setting item. Therefore, it is possible to improve the operability when various settings are performed for a concerning processing, in such a situation that the choices of setting values for a setting item are changed depending on a setting value for a predetermined setting item such as the first setting item which is different from the setting item and in relation to (associated with) a process or processing executable by an image forming apparatus. The state of "the first setting value is the enabled state" or "the first setting value is the disabled state" means such a state that at least the setting for the first setting item on the setting screen is set to be enabled or disabled, and it is unnecessary that the setting for the first setting item on the setting screen is decided by means of the operation of, for example, the enter button (OK button). Further, the "first switching designator" is displayed in order that the setting for the first setting item is switched from the enabled state to the disabled state, but the "first switching designator" is not necessarily displayed on the setting screen when the setting for the first setting item is in the disabled state.

BRIEF DESCRIPTION OF THE DRAWINGS

FIG. 1A shows a block diagram illustrating an electric arrangement of a personal computer on which a device control application is carried.

FIGS. 6A to 6C show flow charts illustrating an operation acceptance processing, a processing in a high speed mode enabled state, and a processing in a high speed mode disabled state respectively.

FIG. 7 shows a flow chart illustrating a scan execution processing.

FIGS. 9A and 9B show flow charts illustrating a processing in a high speed mode disabled state and an operation acceptance processing of the second embodiment respectively.

DESCRIPTION OF THE PREFERRED EMBODIMENTS

Figure 1B:
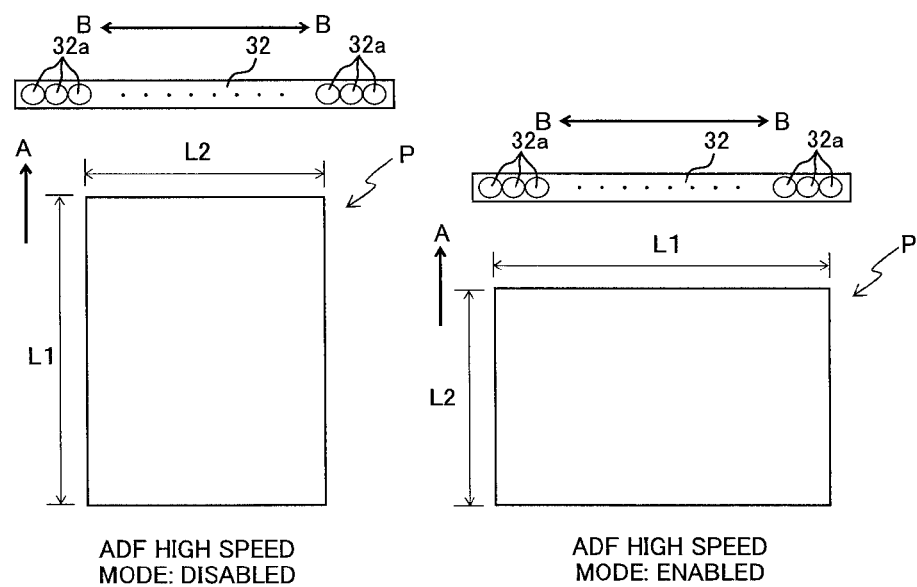
FIG. 1B shows relationships between an arrangement direction of reading elements and an orientation of a manuscript when the ADF high speed mode is enabled and when the ADF high speed mode is disabled.

A preferred embodiment of the present invention will be explained below with reference to the accompanying drawings. At first, a first embodiment of the present invention will be explained with reference to FIGS. 1A to 7. As shown in FIG. 1A, a personal computer (PC) 10, on which a device control application (hereinafter referred to as "application") 14a of the present invention is carried, is connected to a scanner 30 via LAN 50. Although details will be described later on, PC 10, which carries the application 14a, is excellent in the operability when the manuscript size is set irrelevant to the setting state of the ADF high speed mode when the image reading processing, i.e., the reading processing for reading the manuscript is executed by using the scanner 30.

PC 10 has CPU (Central Processing Unit) 11, ROM (Read Only Memory) 12, RAM (Random Access Memory) 13, HDD (Hard Disk Drive) 14, LAN_I/F (LAN interface) 16, input device 17, and LCD (Liquid Crystal Display) 18, and these components are connected to one another via a bus line 19. CPU 11 controls the respective components connected by the bus line 19 in accordance with fixed values and programs stored in ROM 12 and HDD 14. ROM 12 is a memory which stores therein, for example, programs for controlling the operation of PC 10.

RAM 13 is a rewritable volatile memory which has a temporary area for storing, for example, data required for the processing of CPU 11 temporarily. A present value storage area 13a is provided in RAM 13. The present value storage area 13a is an area which stores, for example, decided or determined present setting values of a plurality of setting items respectively prepared for the image reading processing executed by the scanner 30. When a user instructs the start of the image reading processing, the scanner 30 executes the image reading processing corresponding to the respective setting values stored in the present value storage area 13a. In addition, if the respective setting values are stored in a setting value storage area 14c of HDD 14, the concerning stored values are stored in the present value storage area 13a when the application 14a is started up. When the application 14a is started up for the first time, initial values of the respective setting items, which are previously prepared, are stored in the present value storage area 13a. If the user performs the operation to change the setting values for the respective setting items including the ADF high speed mode by the aid of a setting window 70 (see FIG. 2B), the setting values after the change are stored in the present value storage area 13a in accordance with the operation by the user of an OK button BT5 (see FIG. 2B) displayed in the setting window 70.

Further, RAM 13 is provided with an ADF high speed mode flag 13b and a dropdown list 13c. The ADF high speed mode flag 13b is the flag which indicates the check state of a check box 80a (see FIG. 2B) in the setting window 70. If the ADF high speed mode flag 13b is set to be ON, such a state is given that the check box 80a is checked, indicating that the ADF high speed mode is set to be in the enabled state. On the other hand, if the ADF high speed mode flag 13b is set to be OFF, the check box 80a is unchecked. That is, the check box is blank, indicating that the ADF high speed mode is set to be in the disabled state. In the following description, unless otherwise noted, the situation, in which the ADF high speed mode flag 13b is set to be ON, is described as "ADF high speed mode is enabled", while the situation, in which the ADF high speed mode flag 13b is set to be OFF, is described as "ADF high speed mode is disabled". In this embodiment, when the application 14a is started up, the value, which is included in the setting values stored in the setting value storage area 14c and which corresponds to the ADF high speed mode, is set for the ADF high speed mode flag 13b. When the application 14a is started up for the first time, "OFF" is set for the ADF high speed mode flag 13b.

The "ADF high speed mode" is one of a plurality of setting items prepared for the image reading processing to be executed by the scanner 30. The "ADF high speed mode" is the item to set the long time or the short time required for the reading of the manuscript when the scanner 30 performs the supply of the manuscript as the reading objective by using an automatic document feeder (ADF) 33. If the ADF high speed mode is enabled, it is possible to shorten the time required for the reading of the manuscript as compared with if the ADF high speed mode is disabled.

The dropdown list 13c is an area which is provided for storing a plurality of setting values to be selectively displayed on a dropdown list for the manuscript size as one of the setting items in the setting window 70. In this embodiment, the number of the setting values capable of being set as the manuscript size differs depending on whether the ADF high speed mode is disabled or enabled, i.e., whether or not the check box 80*a* is checked. Two types of setting value lists are prepared as the lists of the manuscript sizes for a setting value list 14*b* depending on the setting of the ADF high speed mode. The list, which is included in the setting value list 14*b* and which corresponds to the setting after the switching, is stored in the dropdown list 13*c* every time when the user operates the check box 80*a* of the setting window 70 to switch the setting of the ADF high speed mode between the disabled state and the enabled state.

HDD 14 is a rewritable nonvolatile storage device, in which the application 14*a* and the setting value list 14*b* are stored. The application 14*a* is a program provided by a vendor of the scanner 30, and the application 14*a* is installed into PC 10 by the user to control the operation of the scanner 30 from PC 10. The processings shown in the respective flow charts of FIGS. 5 to 7 described later on are executed by CPU 11 in accordance with the application 14*a*. The setting value list 14*b* is a list of the setting values capable of being set and previously prepared for one setting item. The setting value list 14*b* includes the list of the setting values capable of being set in relation to the manuscript size. As for the setting value list 14*b* in relation to the manuscript size, two types are prepared, i.e., the list available when the ADF high speed mode is disabled and the list available when the ADF high speed mode is enabled. The list available when the ADF high speed mode is disabled includes all of the manuscript sizes capable of being read by the scanner 30. On the other hand, the list available when the ADF high speed mode is enabled is composed of a limited part of sizes of the manuscript sizes capable of being read by the scanner 30.

The setting value storage area 14*c* is provided in HDD 14. The setting value storage area 14*c* is an area which is provided to store the setting values decided for the plurality of setting items respectively prepared for the image reading processing to be executed by the scanner 30. When the user completes the application 14*a*, the respective setting values, which are stored in the present value storage area 13*b*, are stored and retained in the setting value storage area 14*c*.

LAN_I/F 16 is an interface which is provided to perform the communication with any other apparatus connected to a local area network (LAN) 50. The input device 17 is a device which is provided to input the instruction and the information into PC 10, and the input device 17 is exemplified, for example, by a keyboard and a mouse. LCD 18 is a liquid crystal display apparatus. In this embodiment, the input device 17 and LCD 18 are integrated into PC 10.

The scanner 30 is an apparatus capable of executing the reading processing for the manuscript. The scanner 30 is provided with a control unit 31, a reading unit 32, ADF 33, an ADF sensor 34, a manuscript size sensor 35, and a communication unit 36. The control unit 31 is composed of, for example, unillustrated CPU, ROM, and RAM, and the control unit 31 controls the operation of the scanner 30. The reading unit 32 is a line image sensor which includes reading elements 32*a* aligned in a predetermined direction (see FIG. 1B). Those adoptable as the reading element 32*a* are various reading elements including, for example, CIS (Contact Image Sensor) and CCD (Charge Coupled Device). The reading unit 32 reads the manuscript to be transported through the transport route (not shown) provided in the scanner 30, and the image data is generated thereby. The generated image data is outputted to the control unit 31. ADF 33 is operated such that the manuscript, which is placed on a paper feed tray (not shown), is transported along the transport route to the reading position at which the reading is performed by the reading unit 32, and the manuscript, which has been read by the reading unit 32, is transported along the paper discharge route (not shown) to a paper discharge tray (not shown).

The ADF sensor 34 is a sensor which detects whether or not the manuscript capable of being transported by ADF 33 is placed on the paper feed tray. The ADF sensor 34 outputs, to the control unit 31, the signal depending on whether or not the manuscript is placed on the paper feed tray. The control unit 31 judges whether or not the manuscript capable of being transported by ADF 33 is placed on the paper feed tray, based on the signal inputted from the ADF sensor 34. If any inquiry is received from PC 10 about whether or not the manuscript capable of being transported by ADF 33 is placed on the paper feed tray, the information, which indicates the result of the concerning judgment, is outputted to PC 10. Any well-known sensor, which includes, for example, optical sensors and contact sensors, can be adopted as the ADF sensor 33. The manuscript size sensor 35 is a sensor which detects the size of the manuscript. The manuscript size sensor 35 outputs, to the control unit 31, the signal corresponding to the size of the manuscript placed on the paper feed tray, based on the spacing distance between a pair of guides (not shown) provided for the paper feed tray. The control unit 31 judges the manuscript size of the manuscript to be used as the reading objective, based on the signal inputted from the manuscript size sensor 35. If any inquiry is received from PC 10 about the size of the manuscript placed on the paper feed tray, the information, which indicates the result of the concerning judgment, is outputted to PC 10. The communication unit 36 is an interface to perform the communication with any other apparatus connected to LAN 50. In this embodiment, the communication unit 36 and LAN_I/F 16 of PC 10 are connected to LAN 50 respectively. Accordingly, PC 10 and the scanner 30 are connected to one another so that the communication can be made.

As shown in FIG. 1B, if the image reading processing is executed while disabling the ADF high speed mode, the manuscript P is placed on the paper feed tray (not shown) so that the longitudinal direction of the manuscript P is the transport direction of the manuscript (direction of the arrow A). In the following description, the direction (orientation), in which the longitudinal direction of the manuscript P is the transport direction of the manuscript, is referred to as "widthwise direction (orientation) or portrait direction (vertical direction)" in some cases. The manuscript P, which is placed in the widthwise direction, is transported by ADF 33 so that the longitudinal direction thereof extends in the transport direction, and the manuscript P is read by the reading unit 32. The reading unit 32 reads the manuscript P corresponding to the length L1 by using the reading elements 32*a* having a reading width corresponding to the length L2 in the transverse direction of the manuscript P, of the reading elements 32*a* aligned in the subsidiary scanning direction (direction of the arrow B).

On the other hand, if the image reading processing is executed while enabling the ADF high speed mode, the manuscript P is placed on the paper feed tray (not shown) so that the transverse direction of the manuscript P is the transport direction of the manuscript (direction of the arrow A). In the following description, the direction (orientation), in which the transverse direction of the manuscript P is the transport direction of the manuscript, is referred to as "lengthwise direction (orientation) or landscape direction (lateral direction)" in some cases. Therefore, the manuscript P, which is placed in the lengthwise direction, is transported by ADF 33 so that the transverse direction thereof extends in the transport direction, and the manuscript P is read by the reading unit 32. The reading unit 32 reads the manuscript P corresponding to the length L2 by using the reading elements 32a having a reading width corresponding to the length L1 in the longitudinal direction of the manuscript P, of the reading elements 32a aligned in the subsidiary scanning direction (direction of the arrow B).

The reading width, which is used by the reading unit 32 when the ADF high speed mode is enabled, is widened as compared with when the concerning mode is disabled. On the other hand, the transport distance, which is required for the reading of the manuscript P when the ADF high speed mode is enabled, is shortened by the length (L1−L2) as compared with when the concerning mode is disabled. If the manuscript P has such a size that the amount of decrease in the time required for the reading of the manuscript P caused by the decrease in the transport distance required for the reading of the manuscript P is rather large as compared with the amount of increase in the time required for the reading of the manuscript P caused by the increase in the reading width to be used by the reading unit 32, when the direction (orientation) of the manuscript P placed on the paper feed tray is changed from the widthwise direction to the lengthwise direction, then it is possible to shorten the time required for the reading of the manuscript P by placing the manuscript P of the concerning size in the lengthwise direction. This embodiment is constructed such that the ADF high speed mode can be applied to the manuscript P having the specified size. Therefore, it is possible to shorten the reading time for the manuscript P by enabling the ADF high speed mode when the scanner 30 reads the manuscript P having the size to which the ADF high speed mode is applicable, as compared with when the ADF high speed mode is disabled.

Figure 2A:
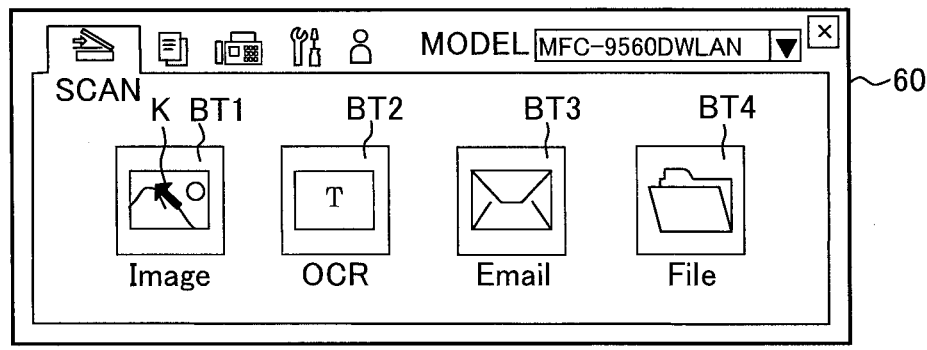
FIG. 2A schematically shows an exemplary scanner control window, and FIGS. 2B and 2C schematically show exemplary setting windows.
Figure 2B:
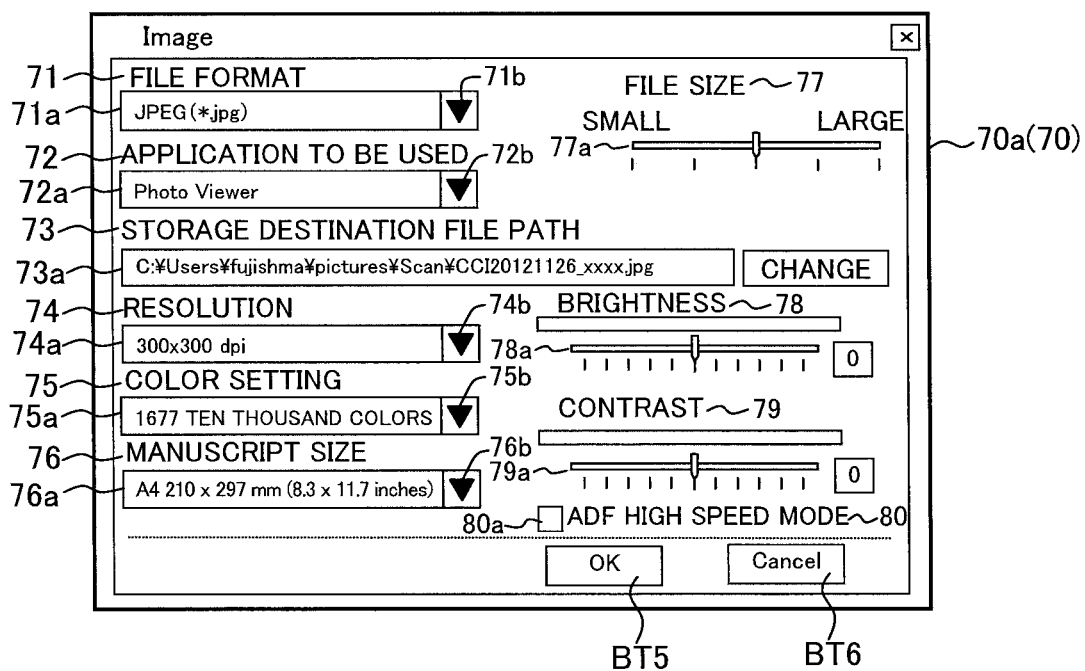
Figure 2C:
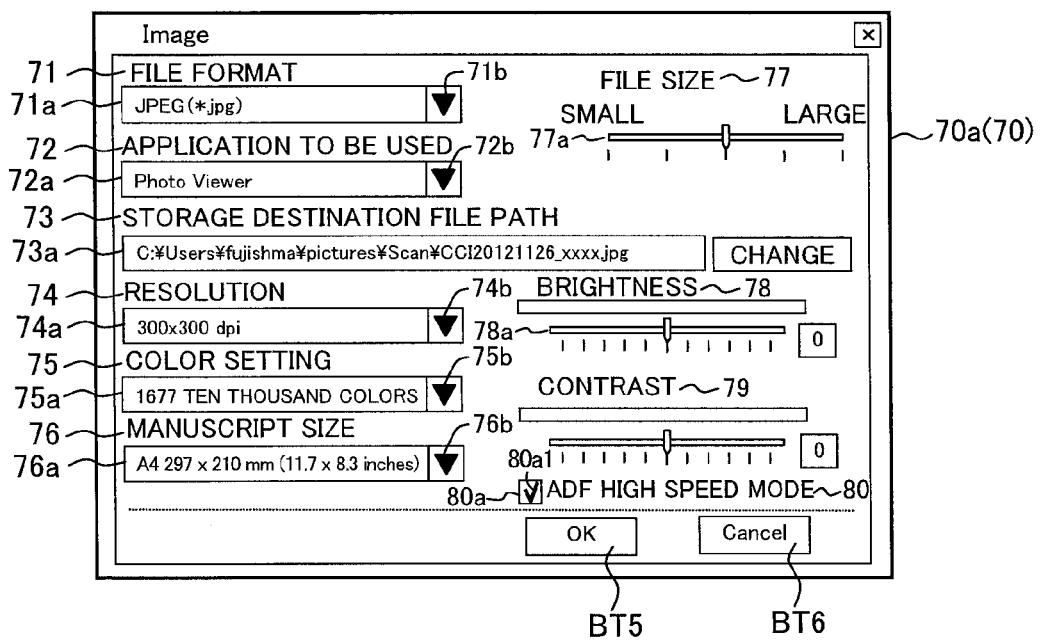
Figure 3A:
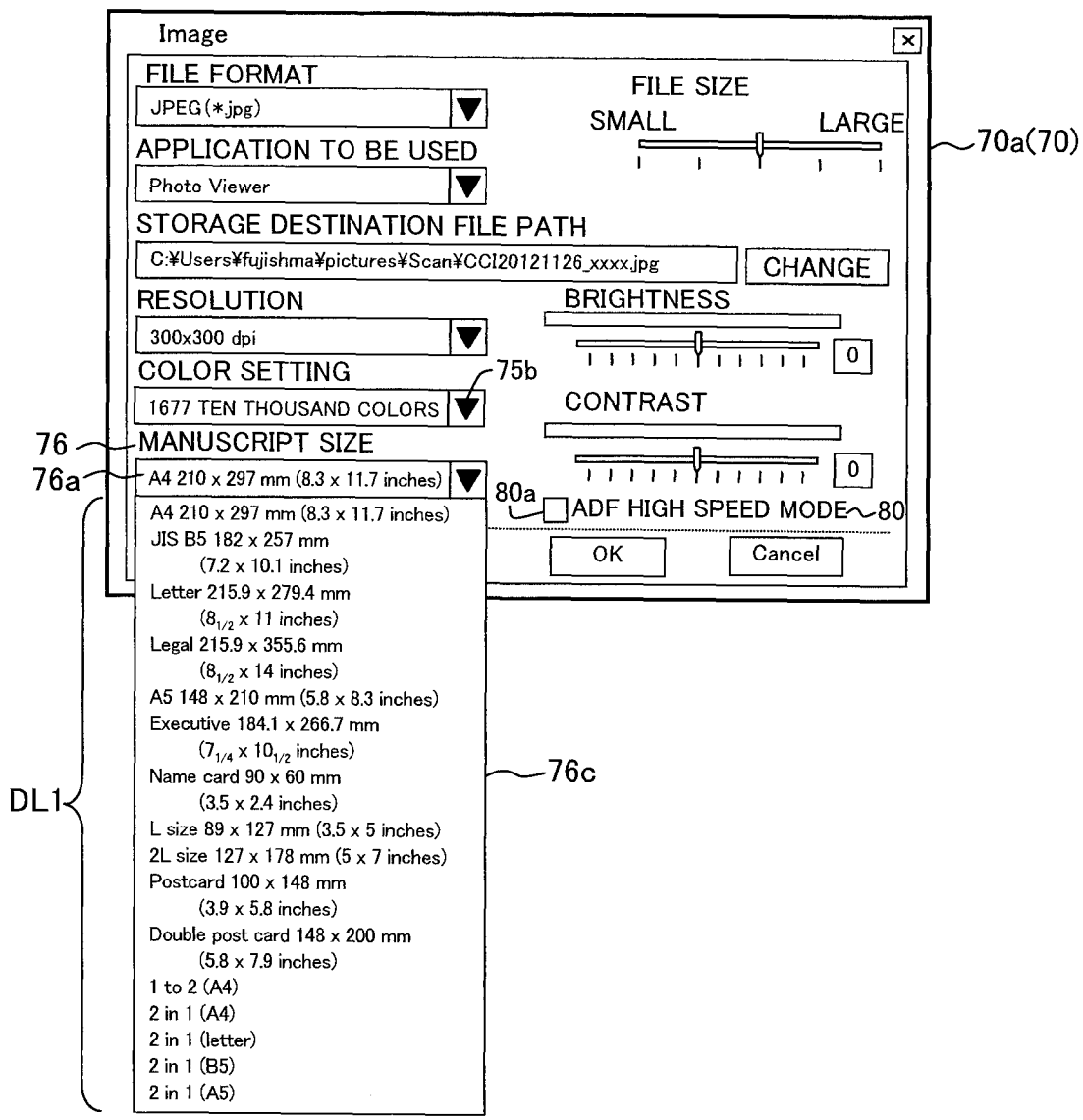
FIGS. 3A and 3B schematically show exemplary setting windows.
Figure 3B:
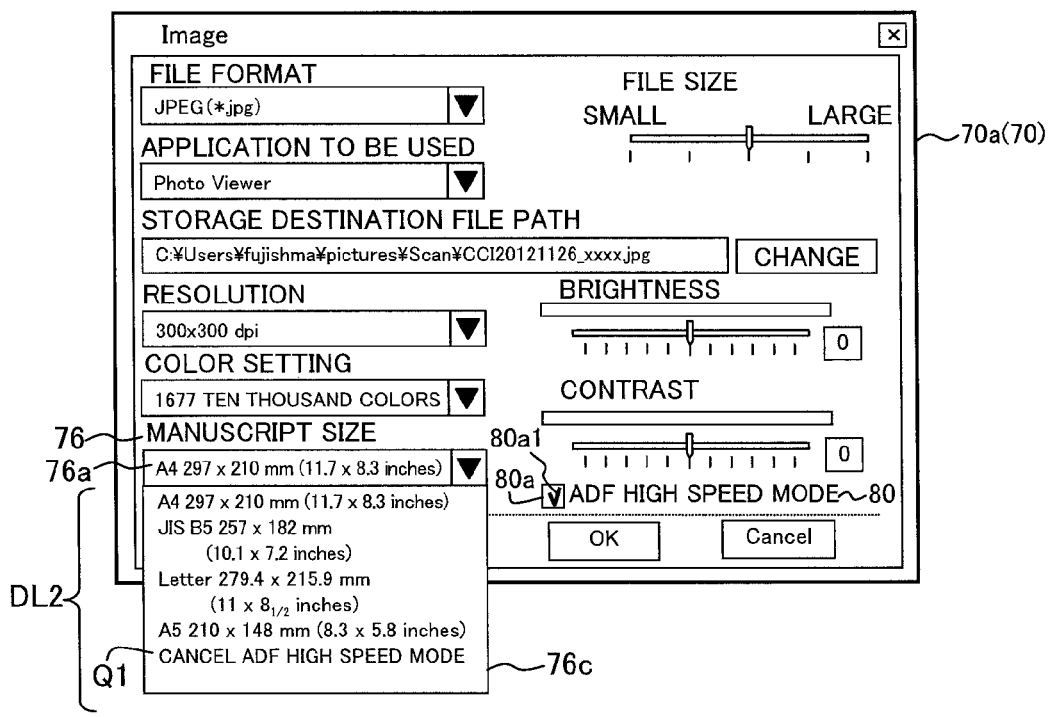
Figure 4A:
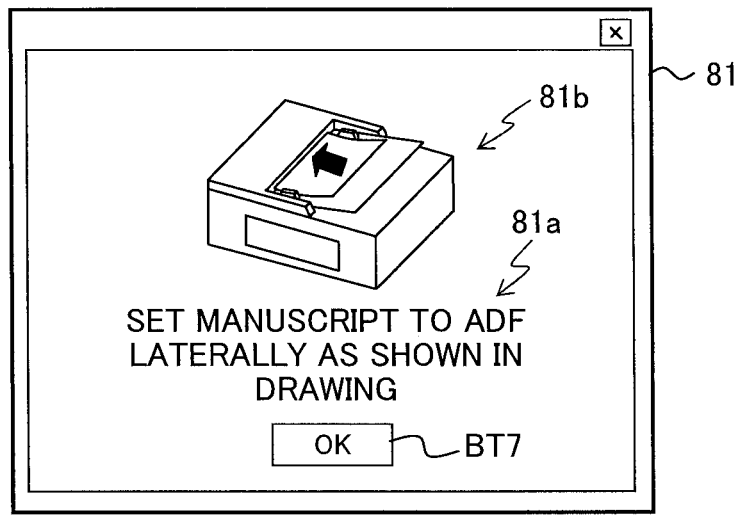
FIGS. 4A to 4C schematically show various types of exemplary warning windows.
Figure 4B:
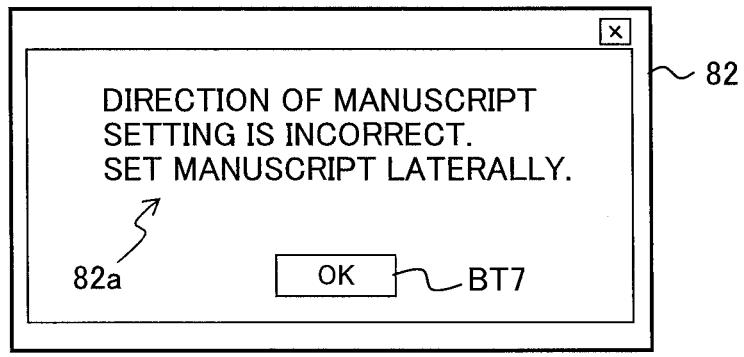
Figure 4C:
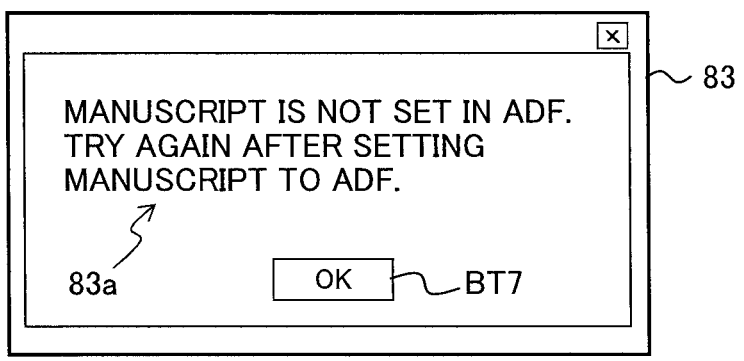

Next, an explanation will be made with reference to FIGS. 2A to 4C about various windows to be displayed on LCD 18 by performing the processings executed by CPU 11 in accordance with the application 14a. FIG. 2A schematically shows an exemplary scanner control window 60. FIGS. 2B and 2C and FIG. 3 schematically show exemplary setting windows 70. FIG. 4 schematically shows various types of exemplary warning windows 81, 82, 83 which may be displayed when the ADF high speed mode is enabled.

When the application 14a is started up in PC 10, the scanner control window 60 is displayed on LCD 18. A plurality of function buttons, to which various types of image reading processings are individually allotted, are displayed in the scanner control window 60. For example, four function buttons BT1 to BT4 are shown in FIG. 2A. An image reading processing (image processing) is allotted to Image button BT1 as the first function button, in which the reading of the manuscript is instructed to the scanner 30 and the image data corresponding to the manuscript is delivered to a predetermined image processing application in PC 10. An image reading processing (OCR processing) is allotted to OCR button BT2 as the second function button, in which the reading of the manuscript is instructed to the scanner 30 and the image data corresponding to the manuscript is delivered to a predetermined OCR application in PC 10. An image reading processing (mail appending processing) is allotted to Email button BT3 as the third function button, in which the reading of the manuscript is instructed to the scanner 30 and the image file corresponding to the manuscript is transmitted from PC 10. An image reading processing (file storing processing) is allotted to File button BT4 as the fourth function button, in which the reading of the manuscript is instructed to the scanner 30 and the image file corresponding to the manuscript is stored in HDD 14 of PC 10.

If the user depresses the left button of the mouse (hereinafter referred to as "left-click") in a state in which the user instructs, with the cursor K, one function button of the function buttons BT1 to BT4 displayed in the scanner control window 60, the image reading processing, which is allotted to the left-clicked function button, is executed. On the other hand, if the user depresses the right button of the mouse (hereinafter referred to as "right-click") in a state in which the user instructs, with the cursor K, one function button of the function buttons BT1 to BT4, the menu (not shown), which corresponds to the right-clicked function button, is displayed on LCD 18. The menu, which is displayed by the right click of the function button, includes the item to display the setting window 70. If the user allows the menu to be displayed by performing the right-click of the function button, and the user performs the operation to select the item in order to display the setting window 70 from the displayed menu, then the setting window 70, which corresponds to the function button right-clicked to display the menu, is displayed on LCD 18.

The setting window 70 is the screen which is provided to set the setting values when the image reading processing is executed with the scanner 30. More specifically, the setting window 70 is the screen which is provided to set the setting values for the plurality of setting items respectively prepared for the image reading processing specified by the function button corresponding to the setting window 70. FIGS. 2B and 2C and FIGS. 3A and 3B show, as examples of the setting window 70, setting windows 70a for setting various setting values in relation to the image processing as the image reading processing corresponding to Image button BT1.

A plurality of setting items prepared for the image reading processing corresponding to the setting window 70 and setting values for the respective setting items are displayed in the setting window 70. The setting values, which are firstly displayed in the setting window 70 when the setting window 70 is displayed, are the setting values which are decided as the present setting value. The setting values are the setting values which are stored in the present value storage area 13a at the timing at which the setting window 70 is displayed. For example, as shown in FIG. 2B, ten types of setting items 71 to 80 are displayed in the setting window 70a corresponding to Image button BT1, and the setting values are displayed for the setting items 71 to 80 respectively. The setting values for the setting items 71 to 79 of the setting items 71 to 80 are displayed by texts in text boxes 71a to 76a or positions of knobs of sliders 77a to 79a.

The setting values, which are displayed in the setting window 70, can be appropriately changed based on the operation by the user. The setting values for the setting items 71, 72, 74 to 76 of the setting items 71 to 79 shown in FIG. 2B can be changed to desired setting values by making selection from a plurality of setting values capable of being set for each of the setting items 71, 72, 74 to 76. For example, a dropdown list of the setting values capable of being set for the setting item corresponding to the operated button can be developed and displayed by performing the operation with respect to the buttons 71b, 72b, 74b to 76b. The user can select one desired setting value from the developed and displayed dropdown list.

On the other hand, the setting item 80 is the setting item in relation to the setting of the ADF high speed mode. The setting item 80 is not limited to the image processing corresponding to Image button BT1, but the setting item 80 is the setting item which is prepared for the image processings corresponding to the other function buttons BT2 to BT4 respectively as well. In other words, the setting item 80 and the setting value thereof are displayed in the respective setting windows 70 corresponding to the function buttons BT2 to BT4 respectively other than Image button BT1 without being limited to the setting window 70a. The setting value for the setting item 80 is expressed by the state of the check box 80a. Specifically, as shown in FIG. 2B, if the check box 80a is blank, it is indicated that the ADF high speed mode is disabled. On the other hand, as shown in FIG. 2C, if the check 80a1 is displayed in the check box 80a, it is indicated that the ADF high speed mode is enabled. The display and the non-display of the check 80a1 in the check box 80a are switched every time when the left-click is performed in a state in which the cursor K is adjusted to the check box 80a. In other words, it is possible to switch the enabled state and the disabled state of the ADF high speed mode every time when the left-click is performed in the state in which the cursor K is adjusted to the check box 80a. The setting of the ADF high speed mode in the image reading processing is decided based on the operation with respect to OK button BT5.

OK button BT5 and Cancel button BT6 are displayed respectively in the setting window 70 which is exemplified, for example, by the setting window 70a. OK button BT5 functions as the enter button which decides or determines the setting values for the setting items displayed in the respective setting windows 70. If OK button BT5 is left-clicked, the setting values, which are changed based on the operation by the user, are stored in the present value storage area 13b, and the setting values are reflected and decided as the present setting values. On the other hand, if Cancel button BT6 is left-clicked, even when the setting values are changed based on the operation by the user, then the setting window 70 is erased without reflecting the change to the present setting values.

When the image reading processing is executed in the state in which the ADF high speed mode is set to be disabled, then the size of the manuscript P as the reading objective is not limited, and it is possible to use the manuscripts P having all sizes capable of being read by the scanner 30. Therefore, for example, as shown in FIG. 3A, if the check box 80a of the setting item 80 is blank in the setting window 70a, the dropdown list DL1 (hereinafter referred to as "list DL1") for the setting item 76 as the item for setting the size of the manuscript P is developed and displayed in the list display area 76c formed under the text box 76a. All manuscript sizes capable of being read by the scanner 30 are displayed in the list DL1 as the setting values capable of being set. The user can select any desired size from the sizes displayed in the list DL1, and the user can the selected size as the setting value of the setting item 76.

On the other hand, when the image reading processing is executed in the state in which the ADF high speed mode is set to be enabled, the size of the usable manuscript P is limited. Therefore, for example, as shown in FIG. 3B, if the check 80a1 is made in the check box 80a of the setting item 80 in the setting window 70a, some of the sizes included in the sizes displayed in the list DL1 are displayed as the setting values capable of being set, in the dropdown list DL2 (hereinafter referred to as "list DL2") for the setting item 76 developed and displayed in the list display area 76c. In other words, the number of the types of the sizes displayed in the list DL2 is smaller than the number of the types of the sizes displayed in the list DL1. As described above, according to the application 14a of this embodiment, the choices (alternatives or options) of the size of the manuscript P, which differ depending on the setting of the ADF high speed mode, i.e., the check state of the check box 80a, are displayed in the list DL1 or the list DL2.

In the case of the application 14a of this embodiment, if the check 80a1 is made in the check box 80a, i.e., if the ADF high speed mode is enabled, then the item Q1, which is provided to set the ADF high speed mode to be disabled, is displayed as a part of the list in the list DL2, in addition to the setting values capable of being set for the setting item 76 (size of manuscript P). In an example shown in FIG. 3B, the item Q1, which is expressed as "Cancel ADF high speed mode", is displayed in the list DL2. The ADF high speed mode can be switched from the enabled state to the disabled state in the same manner as the case in which the user operates the check box 80a checked with the check 80a1, by selecting the item Q1 from the list DL2. If the user performs the operation to select the item Q1, then the check 80a1, which has been displayed in the check box 80a, is cleared to be blank.

In this way, according to the application 14a of this embodiment, if the ADF high speed mode is enabled, the item Q1, which is provided to set the ADF high speed mode to be disabled, is displayed in the list DL2 together with the list of the sizes of the manuscript P capable of being set when the ADF high speed mode is enabled. The item Q1 is displayed as a part of the list DL2, and hence the user can easily recognize the operation to switch the ADF high speed mode from the enabled state to the disabled state during the display of the list DL2. When the user operates the item Q1 during the display of the list DL2, then the ADF high speed mode can be thereby switched to the disabled state, and the list DL1 can be displayed. It is possible to set any desired size of the manuscript P having been not displayed in the list DL2, from displayed the list DL1.

According to the application 14a of this embodiment, when the ADF high speed mode is in the enabled state, the ADF high speed mode can be switched to the disabled state by means of the selection of the item Q1 from the list DL2 or the operation (left-click) with respect to the check box 80a. On the other hand, the operation, which is to be performed in order to switch the ADF high speed mode from the disabled state to the enabled state, is limited to the operation for the check box 80a. In other words, in this embodiment, the item Q1 is not displayed in the list DL1 when the ADF high speed mode is in the disabled state. As a result, a larger number of the methods in which the ADF high speed mode is switched from the enabled state to the disabled state are provided as compared with the method or methods in which the ADF high speed mode is switched from the disabled state to the enabled state.

According to the application 14a of this embodiment, when the ADF high speed mode is switched from the enabled state to the disabled state, the list DL1 is developed and displayed irrelevant to the operation with respect to the button 76b. When the image reading processing is executed in the state in which the ADF high speed mode is set to be enabled, the size of the manuscript P capable of being used is limited. On the other hand, when the image reading processing is executed in the state in which the ADF high speed mode is set to be disabled, the limitation is not given. Therefore, when the ADF high speed mode is switched from the enabled state to the disabled state, the number of the types of the sizes of the manuscript P capable of being set is increased as compared with the number of the types of the sizes of the manuscript P having been capable of being set before the switching. The sizes, which cannot be set when the ADF high speed mode is enabled, are included in the sizes of the manuscript P displayed in the list DL1. Therefore, when the ADF high speed mode is switched from the enabled state to the disabled state, the user can easily set the size having been incapable of being set when the ADF high speed mode is enabled, from List D1 which is automatically opened.

As described above, the direction (orientation) of the manuscript P to be placed on the paper feed tray differs between the situation in which the ADF high speed mode is enabled and the situation in which the ADF high speed mode is disabled. Therefore, when the ADF high speed mode is set to be enabled, if the manuscript P is placed on the paper feed tray in any erroneous direction, then it is impossible to correctly utilize the ADF high speed mode. In relation thereto, in the case of the application 14a of this embodiment, when the ADF high speed mode is switched from the disabled state to the enabled state, the warning window 81 is displayed on LCD 18. The warning window 81 is the window which is provided to inform the user of the information in relation to the placement direction of the manuscript P. For example, a message 81a and an illustration 81b, which indicate that the manuscript P should be placed in the lengthwise (landscape) direction, are displayed in a warning window 81 shown in FIG. 4. The user becomes aware of, from the warning window 81, that the manuscript P should be placed on the paper feed tray in the placement direction or orientation (lengthwise direction or orientation) corresponding to the setting of the ADF high speed mode. Therefore, it is possible to suppress such a situation that the manuscript P is not placed in the direction which corresponds to the ADF high speed mode and it becomes impossible to perform the image reading processing in accordance with the ADF high speed mode.

In the case of the application 14a of this embodiment, when the reading instruction to read the manuscript P is inputted by performing the left-click with respect to one function button of the function buttons BT1 to BT4 displayed in the scanner control window 60, if the placement direction (orientation) of the manuscript P, which is judged based on the state of the manuscript size sensor 35, is erroneous, a warning window 82 is displayed on LCD 18. The warning window 82 is the window which is provided to inform the user of the information in relation to the placement direction of the manuscript P. For example, a message 82a, which indicates that the placement direction of the manuscript P is erroneous or incorrect, is displayed as the information in relation to the placement direction of the manuscript P in the warning window 82 shown in FIG. 4B. The user can recognize from the warning window 82 that the placement direction of the manuscript P is erroneous. Accordingly, it is possible to correct the placement direction of the manuscript P before performing the reading of the manuscript P. Therefore, it is possible to suppress such a situation that it becomes impossible to perform the intended image reading processing due to the erroneous placement direction of the manuscript P.

The ADF high speed mode is the mode which is provided on the premise that the manuscript P as the reading objective is transported by using ADF 33. Therefore, if the manuscript P, which can be transported by ADF, is not placed on the paper feed tray although the ADF high speed mode is set to be enabled, it is impossible to utilize the ADF high speed mode. In relation thereto, in the case of the application 14a of this embodiment, when the reading instruction to read the manuscript P is inputted, if it is judged that the manuscript P is not placed on the paper feed tray based on the state of the ADF sensor 34 as acquired from the scanner 30, then a warning window 83 is displayed on LCD 18. The warning window 83 is the window which is provided to inform the user of the fact that the manuscript P is not placed on the paper feed tray. For example, a message 83a, which informs the user of the fact that the manuscript P is not placed on the paper feed tray, is displayed in the warning window 83 shown in FIG. 4C. The user can recognize from the warning window 83 that the manuscript P should be placed on the paper feed tray. Therefore, it is possible to suppress such a situation that the manuscript P is not placed on the paper feed tray and it is impossible to utilize the ADF high speed mode.

OK buttons BT7, which accept the intension of the user, are displayed in the warning windows 81 to 83. Each of the warning windows 81 to 83 is erased when OK button BT7 is operated.

Figure 5A:
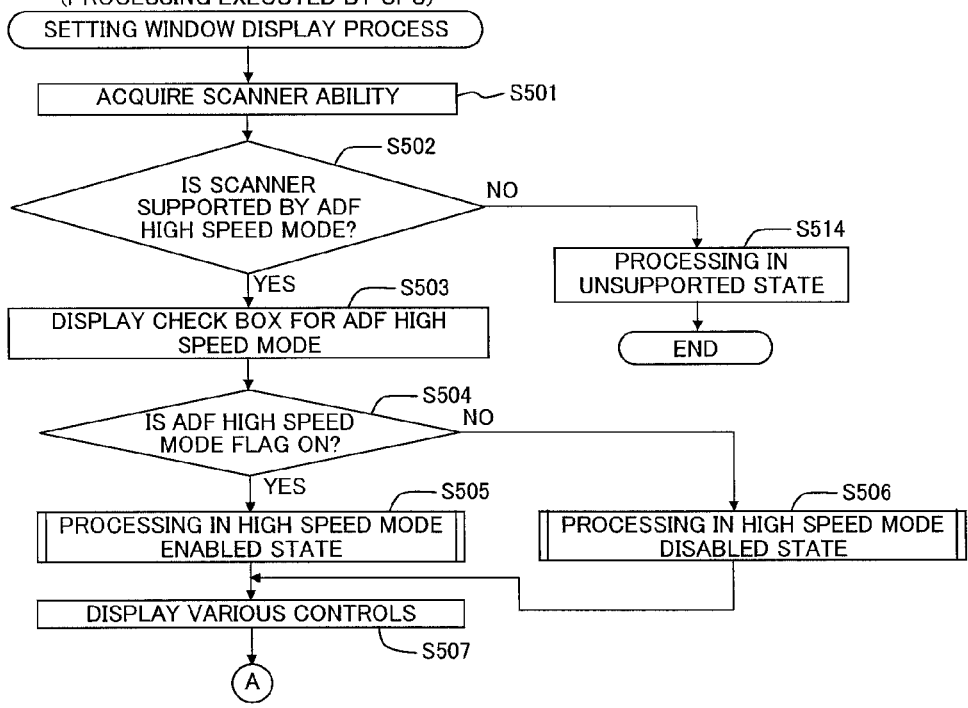
FIGS. 5A and 5B show a flow chart illustrating a setting window display processing.
Figure 5B:
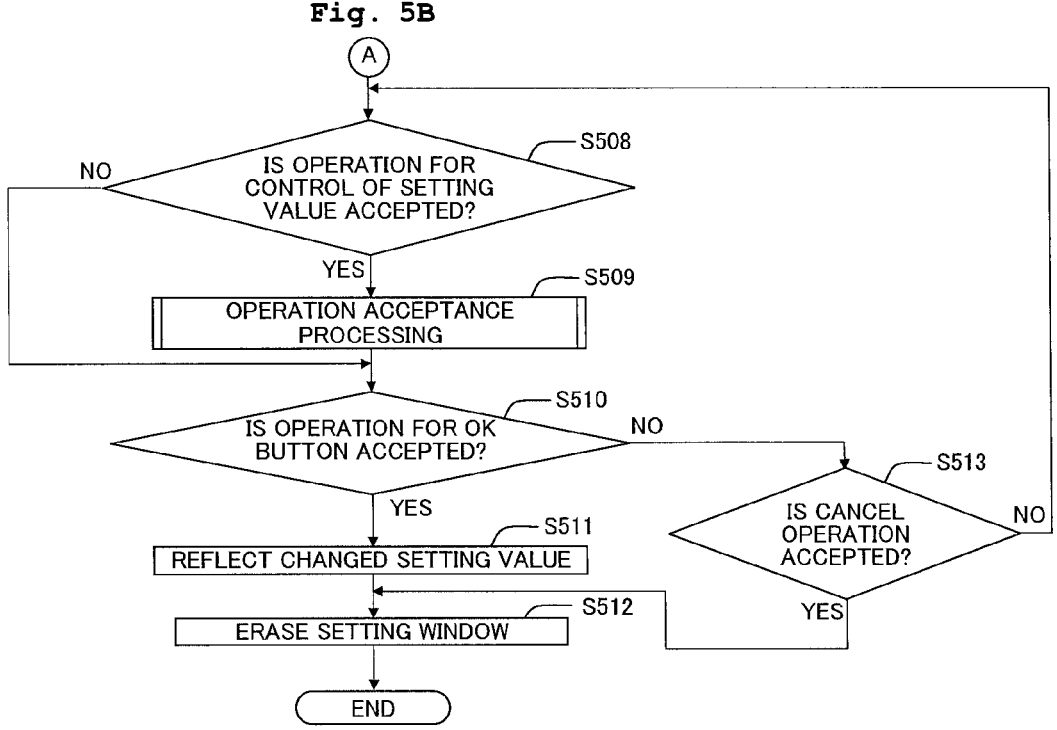

An explanation will be made with reference to FIG. 5 about the setting window display processing. This processing is the processing which is to be executed by CPU 11 in accordance with the application 14a. This processing is started if the operation to display the setting window 70 is performed for one function button of the function buttons BT1 to BT4 displayed in the scanner control window 60. In Step S501 ("Step" will be omitted later on), CPU 11 acquires the scanner ability of the scanner 30 designated as the scanner to be utilized. The scanner abilities of the respective scanners 30 capable of being utilized by the application 14a are stored in HDD 14 when the application 14a is installed. It is also allowable to adopt such a construction that CPU 11 acquires the scanner ability in S501 by inquiring the scanner ability of the scanner 30 designated as the scanner to be utilized.

CPU 11 judges whether or not the scanner 30 to be utilized is the scanner supported by (compatible with) the ADF high speed mode with reference to the acquired scanner ability (S502). If CPU 11 judges that the scanner 30 is the scanner which is unsupported by (incompatible with) the ADF high speed mode (S502: No), then CPU 11 displays, on LCD 18, the setting window for the scanner not supported by the ADF high speed mode as the processing in the unsupported state, the processings corresponding to the respective operations inputted via the setting window are executed (S514), and this processing is completed.

On the other hand, if CPU 11 judges in S502 that the scanner 30 is the scanner which is supported by the ADF high speed mode (S502: Yes), CPU 11 executes the processings of S503 to S507 to thereby display, on LCD 18, the setting window 70 corresponding to one operated function button of the function buttons BT1 to BT4. Specifically, CPU 11 displays, in S503, the check box 80a for the ADF high speed mode 80 in the setting window 70.

Subsequently, if ON is set for the ADF high speed mode flag (S504: Yes), CPU 11 executes the processing in the high speed mode enabled state such that the display, which is provided when the ADF high speed mode is enabled, is displayed in the setting window 70 (S505). Detailed processing of the processing in the high speed mode enabled state (S505) will be described later on with reference to FIG. 6B. On the other hand, if OFF is set for the ADF high speed mode flag 13b (S504: No), CPU 11 executes the processing in the high speed mode disabled state such that the display, which is provided when the ADF high speed mode is disabled, is displayed in the setting window 70 (S506). Detailed processing of the processing in the high speed mode disabled state (S506) will be described later on with reference to FIG. 6C. After the processing of S505 or S506, CPU 11 displays, in the setting window 70, various controls corresponding to one operated function button (S507). The controls, which are displayed in accordance with the processing of S507, include OK button BT5 and Cancel button BT6. If this processing is started based on the operation with respect to the function button BT1, for example, the setting window 70a shown in FIG. 2C is displayed on LCD 18 as a result of the execution of the processings of S503 to S507.

Figure 6A:
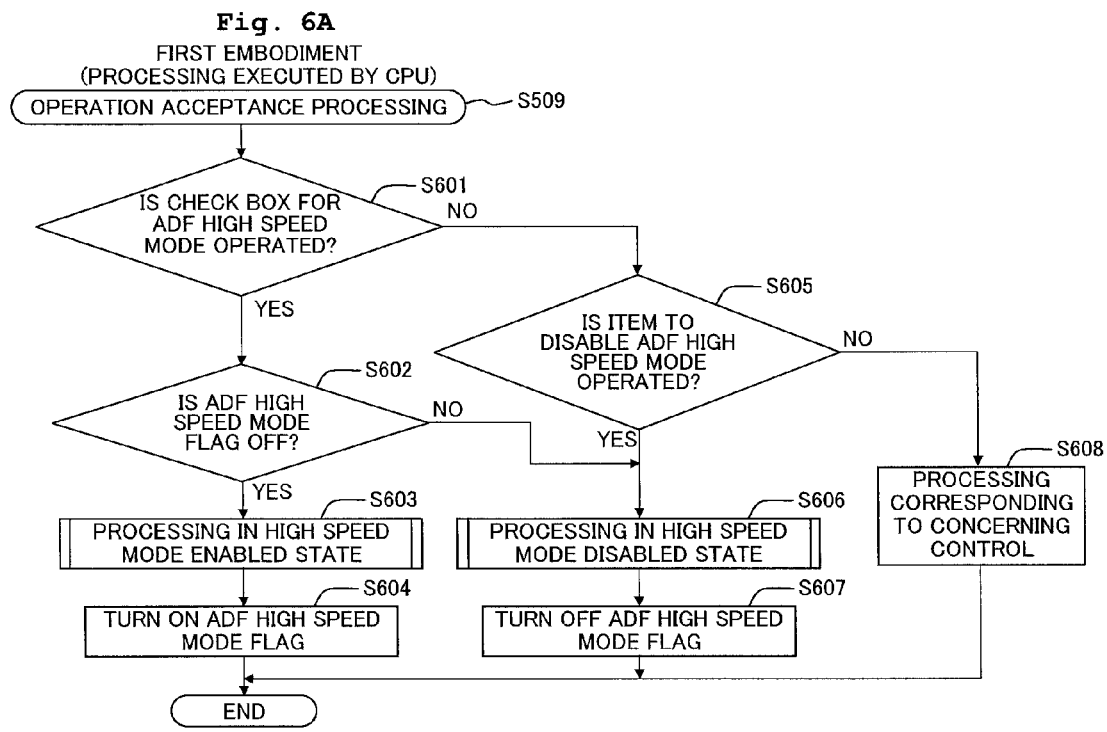

If CPU 11 accepts the operation for the control of the setting value of the controls displayed in the setting window 70 (S508: Yes), CPU 11 executes the operation acceptance processing for executing the processing corresponding to the control for which the operation is accepted (S509). Detailed processing of the operation acceptance processing (S509)

will be described later on with reference to FIG. 6A. After the processing of S509, CPU 11 allows the processing to proceed to S510 to judge whether or not CPU 11 accepts the operation for OK button BT5 displayed on the setting window 70. On the other hand, if CPU 11 does not accept the operation for the control of the setting value (S508: No), CPU 11 allows the processing to proceed to S510.

If CPU 11 neither accepts the operation for OK button BT5 nor the cancel operation (S510: No, S513: No), CPU 11 waits for the operation for any control displayed in setting window 70. The "cancel operation" described above is the operation performed for Cancel button BT6 displayed in the setting window 70 or the operation performed for the button to instruct the closing of the setting window 70. In S510, if CPU 11 accepts the operation for OK button BT5 (S510: Yes), CPU 11 stores the setting value changed based on the user operation in the present value storage area 13b to reflect the setting value as the present setting value (S511). In accordance with the processing of S511, the setting values for the respective setting items 71 to 80 displayed in the setting window 70 are decided as the present setting values. Subsequently, CPU 11 erases the displayed setting window 70 (S512), and this processing is completed. On the other hand, if CPU 11 accepts the cancel operation without accepting the operation for OK button BT5 (S510: No, S513: Yes), then CPU 11 erases the displayed setting window 70 (S512), and this processing is completed. Therefore, when the cancel operation is performed, even if the setting value is changed based on the user operation, then the change is not reflected to the present setting value.

An explanation will be made with reference to FIG. 6A about the operation acceptance processing (S509). If the control, for which the operation is accepted, is the check box 80a for the ADF high speed mode 80 (S601: Yes), CPU 11 judges whether or not the ADF high speed mode flag 13b is set to OFF (S602). If CPU 11 judges that the ADF high speed mode flag 13b is set to OFF (S602: Yes), it is judged that the operation, which is performed for the check box 80a, is the operation for making the check 80a1. Therefore, in such a situation, CPU 11 executes the processing in the high speed mode enabled state (S603) in the same manner as in S505 described above. Subsequently, CPU 11 sets the ADF high speed mode flag 13b to ON (S604), and this processing is completed.

On the other hand, if CPU 11 judges that the ADF high speed mode flag 13b is set to ON (S602: No), it is judged that the operation, which is performed for the check box 80a, is the operation for removing the check 80a1. Therefore, in such a situation, CPU 11 executes the processing in the high speed mode disabled state (S606) in the same manner as in S506 described above. Subsequently, CPU 11 sets the ADF high speed mode flag 13b to OFF (S607), and this processing is completed.

If the control, for which the operation is accepted, is not the check box 80a but the item Q1 to disable the ADF high speed mode (S601: No, S605: Yes), CPU 11 allows the processing to proceed to S606. In other words, CPU 11 executes the same processing when the item Q1 is operated as when the operation is performed to remove the check 80a1 from the check box 80a. If the control, for which the operation is accepted, is neither the check box 80a nor the item Q1 (S605: No), then CPU 11 executes the processing corresponding to the concerning control (S608), and this processing is completed. The processing corresponding to the concerning control is exemplified, for example, as follows. That is, when the button 76b is operated in a state in which the list DL1 or DL2 is enclosed, the list DL1 or DL2 corresponding to the value of the ADF high speed mode flag 13b is developed and displayed. On the other hand, the processing is exemplified as follows. That is, when the button 76b is operated in a state in which the list DL1 or DL2 is developed and displayed, the developed and displayed list DL1 or DL2 is enclosed.

An explanation will be made with reference to FIG. 6B about the processing in the high speed mode enabled state (S505, S603). CPU 11 displays the check 80a1 in the check box 80a of the setting window 70 which is being displayed (S621). Subsequently, CPU 11 clears the dropdown list 13c (S622), and the list of the manuscript size, which is included in the setting value list 14b and which corresponds to such a case that the ADF high speed mode is enabled, is set for the dropdown list 13c (S623). Subsequently, CPU 11 adds, to the dropdown list 13c, the item Q1 which is provided to disable the ADF high speed mode (S624). As a result of the processings of S623 and S624, for example, the list DL2 shown in FIG. 3B can be displayed as the list DL2 corresponding to the manuscript size (setting item 76) to be used when the ADF high speed mode is enabled. Subsequently, CPU 11 displays, on LCD 18, the warning window to inform the user of the placement direction of the manuscript, for example, the warning window 81 shown in FIG. 4A (S625), and this processing is completed.

Figure 6C:
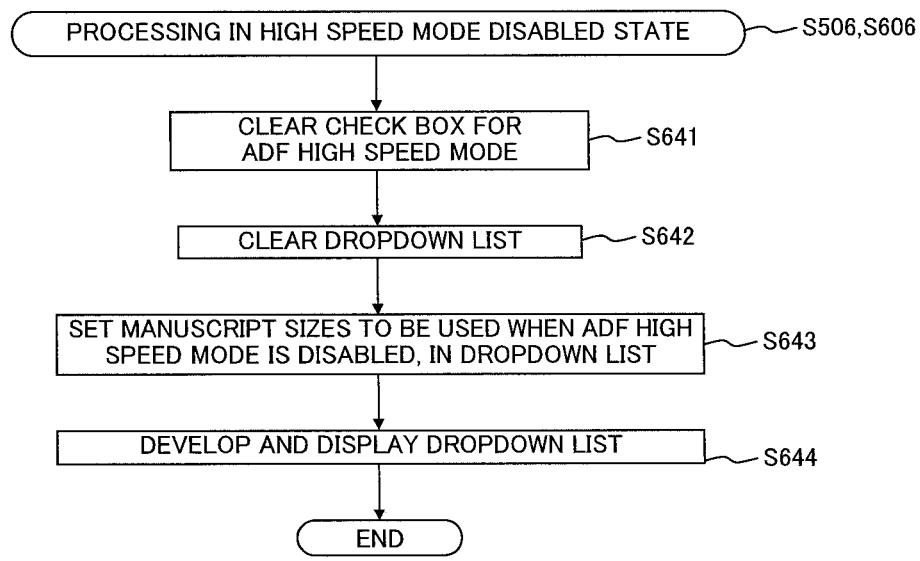

An explanation will be made with reference to FIG. 6C about the processing in the high speed mode disabled state (S506, S606). CPU 11 clears the check box 80a of the setting window 70 which is being displayed (S641). As a result of the processing of S641, the check box 80a is blanked. Subsequently, CPU 11 clears the dropdown list 13c (S642). The list of the manuscript size, which is included in the setting value list 14b and which corresponds to such a case that the ADF high speed mode is disabled, is set to the dropdown list 13c (S643). Subsequently, CPU 11 develops and displays the dropdown list of the manuscript size which is based on the dropdown list 13c (S644), and this processing is completed. As a result of the processings of S643 and S644, for example, the list DL1 shown in FIG. 3A can be developed and displayed as the dropdown list corresponding to the manuscript size (setting item 76). In this way, when the ADF high speed mode is switched from the enabled state to the disabled state, for example, the list DL1 shown in FIG. 3A is automatically developed and displayed.

An explanation will be made with reference to FIG. 7 about the scan execution processing. This processing is the processing which is executed by CPU 11 in accordance with the application 14a. This processing is started when the operation (left-click) is performed with respect to one function button of the function buttons BT1 to BT4 displayed in the scanner control window 60 in order to execute the image reading processing allotted to the concerning function button. CPU 11 judges whether or not the ADF high speed mode is enabled based on the setting value stored in the present value storage area 13a (S701).

If CPU 11 judges that the ADF high speed mode is disabled (S701: No), CPU 11 executes the image reading processing allotted to the operated function button (S708). Specifically, in S708, CPU 11 firstly instructs the scanner 30 to read the manuscript P corresponding to the setting value stored in the present value storage area 13a. Subsequently, CPU 11 receives, from the scanner 30, the image data of the manuscript P read by the scanner 30 based on the instruction. CPU 11 applies the processing corresponding to the operated function button to the received image data. For example, when the operated function button is Image button BT1, CPU 11 executes the processing to deliver the image data received from the scanner 30 to the predetermined image processing application. After the execution of the image reading processing (S708), CPU 11 completes this processing.

On the other hand, if CPU 11 judges that the ADF high speed mode is enabled (S701: Yes), then CPU 11 inquires of the scanner 30 about the state of the ADF sensor 34, and the concerning state is acquired (S702). For example, CPU 11 acquires the output value of the ADF sensor 34 as the state of the ADF sensor 34. CPU 11 judges whether or not the manuscript P capable of being transported by ADF 33 is placed on the paper feed tray (not shown) of the scanner 30, based on the acquired state of the ADF sensor 34 (S703). If CPU 11 judges that the manuscript P is not placed on the paper feed tray (S703: No), then CPU 11 displays, on LCD 18, the warning window to inform the user of the fact that the manuscript P is not placed on the paper feed tray (for example, the warning window 83 shown in FIG. 4C), and this processing is completed.

If CPU 11 judges in S703 that the manuscript P is placed on the paper feed tray (S703: Yes), then CPU 11 inquires of the scanner 30 about the state of the manuscript size sensor 35, and the concerning state is acquired (S705). For example, CPU 11 acquires the output value of the manuscript size sensor 35 as the state of the manuscript size sensor 35. CPU 11 judges whether or not the manuscript width of the manuscript P placed on the paper feed tray (length of the manuscript P in the direction extending along the alignment of the reading elements 32a in relation to the manuscript P) is longer than the length in the transverse direction in relation to the manuscript size stored in the present value storage area 13a, based on the acquired state of the manuscript size sensor 35 (S706). For example, when the size of the manuscript stored in the present value storage area 13a is A4, CPU 11 judges whether or not the manuscript width of the manuscript P placed on the paper feed tray is longer than 210 mm.

If CPU 11 judges that the manuscript width of the manuscript P placed on the paper feed tray is not more than the length in the transverse direction in relation to the size of the manuscript stored in the present value storage area 13a, i.e., in relation to the set manuscript size (S706: No), it is judged that the manuscript P is placed in the widthwise direction. Therefore, in such a situation, CPU 11 displays, on LCD 18, the warning window to inform the user of the fact that the placement direction of the manuscript P is erroneous (for example, the warning window 82 shown in FIG. 4B) (S707), and this processing is completed. On the other hand, if CPU 11 judges that the manuscript width of the manuscript P placed on the paper feed tray is longer than the length in the transverse direction in relation to the set manuscript size (S706: Yes), it is judged that the manuscript P is placed in the widthwise direction which is the correct placement direction to utilize the ADF high speed mode. Therefore, in such a situation, CPU 11 executes the image reading processing (S708), and this processing is completed.

According to the application 14a of this embodiment, it is possible to improve the operability when the setting value is set for the setting item if the choices capable of being set differ depending on the setting of the ADF high speed mode in relation to the predetermined setting item such as the size of the manuscript P or the like.

Next, a second embodiment will be explained with reference to FIG. 8 and FIGS. 9A and 9B. The first embodiment described above is constructed such that if the ADF high speed mode is disabled, the list, which is constructed by only the setting values capable of being set for the setting item 76 (size of the manuscript P), is displayed as the list DL1. In place thereof, in the second embodiment, the item Q2, which is provided to enable the ADF high speed mode set in the disabled state at present, is added to the list DL1. In the second embodiment, the same parts or components as those of the first embodiment described above are designated by the same reference numerals, any explanation of which will be omitted.

Figure 8:
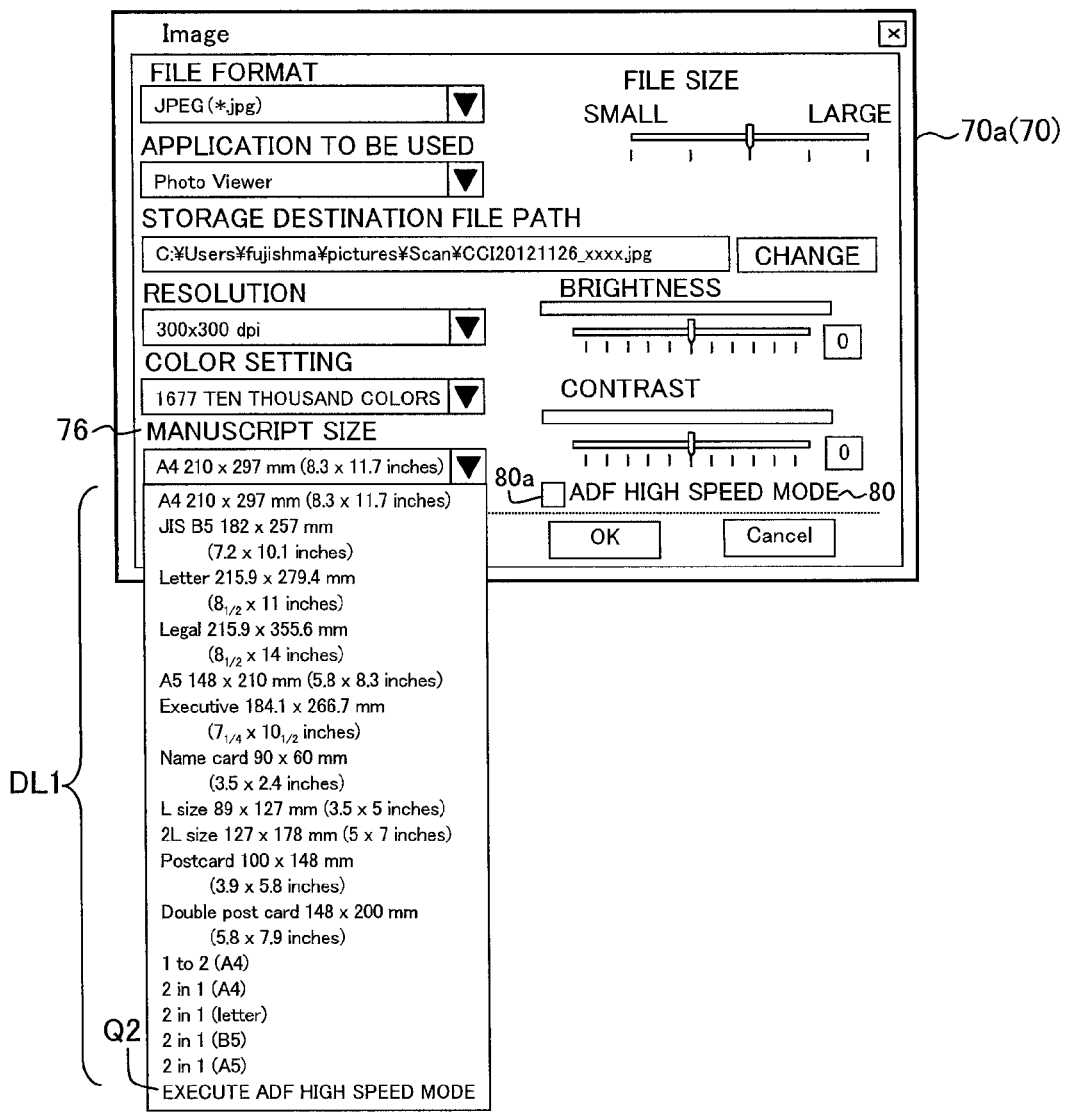
FIG. 8 schematically shows an exemplary setting window of a second embodiment.

As shown in FIG. 8, in the setting window 70a in which the check box 80a of the setting item 80 is blank, the item Q2, which is provided to enable the ADF high speed mode set to be disabled at present, is displayed in the list DL1 for the setting item 76 (size of the manuscript P), in addition to the setting values capable of being set as the size of the manuscript P. In the example shown in FIG. 8, the item Q2, which is expressed as "Execute ADF high speed mode", is displayed in the list DL1. When the user selects the item Q2 from the list DL1, the ADF high speed mode can be switched from the disabled state to the enabled state in the same manner as when the blank check box 80a is operated. Therefore, when the user performs the operation to select the item Q2 in the list DL1 in the state of the setting window 70 shown in FIG. 8, the check 80a1 is displayed in the check box 80a which has been blank.

An explanation will be made with reference to FIG. 9A about the processing in the high speed mode disabled state of the second embodiment (S506, S606). The processings shown in the respective flow charts of FIG. 9A and FIG. 9B described later on are executed by CPU 11 in accordance with an application 14a of the second embodiment. An explanation will be principally made about the difference from the processing in the high speed mode disabled state of the first embodiment described above (FIG. 6C). In this processing, CPU 11 sets, for the cleared dropdown list 13c, the list of the manuscript size for the situation to be provided when the ADF high speed mode is disabled, of the setting value list 14b (S643). After that, the item Q2, which is provided to enable the ADF high speed mode, is added to the dropdown list 13c (S901). As a result of the processings of S643 and S901, for example, it is possible to display the list DL1 shown in FIG. 8 as the list DL1 for the manuscript size (setting item 76) to be used when the ADF high speed mode is enabled.

An explanation will be made with reference to FIG. 9B about the operation acceptance processing of the second embodiment. An explanation will be principally made about the difference from the operation acceptance processing of the first embodiment described above (FIG. 6A). In this processing, if CPU 11 judges that the control, for which the operation is accepted, is not the item Q1 but the item Q2 which is provided to enable the ADF high speed mode (S605: No, S921: Yes), CPU 11 allows the processing to proceed to S603. In other words, CPU 11 executes the same processing when the item Q2 is operated as when the operation to make the check 80a1 in the check box 80a is performed. On the other hand, if the control, for which the operation is accepted, is not the item Q2 (S921: No), then CPU 11 executes the processing corresponding to the concerning control (S608), and this processing is completed.

According to the application 14a of the second embodiment, the item Q2 is displayed as a part of the list DL1. Therefore, the user can easily recognize the operation to switch the ADF high speed mode from the disabled state to the enabled state during the display of the list DL1.

In the embodiments described above, the device control application 14a is an example of the instruction capable of being executed by a computer. The scanner 30 is an example of the image forming apparatus. PC 10 is an example of the information processing apparatus. LCD 16 is an example of the display unit. CPU 11 is an example of the control unit. HDD 14 is an example of the storage unit. The reading element 32a is an example of the reading element. The bus line 19 and LAN_I/F 16 are examples of the communication unit. The manuscript P is an example of the manuscript. The setting items 71 to 80 are examples of the plurality of setting items. The texts included in the text boxes 71a to 76a or the values indicated by the positions of the knobs of the sliders 77a to 79a are examples of the setting value. The setting item 80 is an example of the first setting item. The situation, in which the check 80a1 is made in the check box 80a, is an example of the situation in which the first setting value is the enabled state. The situation, in which the check box 80a is blank, is an example of the situation in which the first setting value is the disabled state. The setting item 76 is an example of the second setting item. The setting value list 14b is an example of the setting value group including the plurality of setting values which is settable for the second setting item. The setting windows 70, 70a are examples of the setting screen. The item Q1 is an example of the first switching designator. The list display area 76c is an example of the list display area. The lists DL1, DL2 are examples of the list and the dropdown list. The plurality of setting items displayed in the list DL1 shown in FIG. 3A are examples of the setting values included in the second sub setting value group. The plurality of setting items displayed in the list DL2 shown in FIG. 3B (except for the item Q1) are examples of the setting values included in the first sub setting value group. The item Q2 is an example of the second switching designator. The check box 80a is an example of the third switching designator. The image reading processings allotted to the function buttons BT1 to BT4 are examples of the reading processing.

The present invention has been explained above based on the embodiments. However, the present invention is not limited to the foregoing embodiments at all. It can be easily presumed that various improvements and changes can be made within a range without deviating from the gist or essential characteristics of the present invention.

For example, in the respective embodiments described above, PC 10 is exemplified as the information processing apparatus which carries the application 14a by way of example. However, it is possible to apply, as the information processing apparatus, various apparatuses or devices including, for example, the smart phone, the mobile phone, PDA, and the tablet terminal provided that the apparatus or device can be connected to the image forming apparatus and the display unit such as LCD or the like capable of displaying the information. The respective embodiments described above are exemplified by way of example as the form in which the input device 17 and LCD 18 are integrated into PC 10 as the information processing apparatus. However, it is also allowable to adopt such a form that the input device 17 and LCD 18 are connected to PC 10 as separate members provided separately from PC 10.

In the respective embodiments described above, the scanner 30 is exemplified by way of example as the image forming apparatus controlled by the application 14a. However, the present invention can be also applied while using, as the image forming apparatus, any other apparatus capable of generating the image data based on the manuscript reading, for example, any multifunction peripheral apparatus having a plurality of functions including the scanner function. The respective embodiments described above are constructed such that parts of the image reading processings allotted to the function buttons BT1 to BT4, for example, the processing to deliver the image data to various applications and the processing to store the image file are executed by PC 10. However, it is also allowable to adopt such a construction that all of the processings are executed by the image forming apparatus such as the scanner 30 or the like.

In the respective embodiments described above, the present invention is applied to the case in which the content or the number of the setting value or values capable of being set as the manuscript size (setting item 76) differs depending on the setting of the ADF high speed mode (setting item 80) as one of the setting items in relation to the image reading processing to be executed by the scanner 30. However, there is no limitation thereto. The present invention can be applied when the content or the number of the setting value or values capable of being set as another setting item differs depending on the setting of one setting item of a plurality of setting items in relation to a predetermined processing to be executed by the image forming apparatus. For example, the present invention can be applied when the setting is provided for whether or not the reading of a photograph image is performed as one of setting items in relation to the image reading processing to be executed by the scanner 30, and the content or the number of the setting value or values capable of being set as a resolution as another setting item differs depending on the concerning setting.

As for the predetermined processing, the present invention can be also applied to various processings including, for example, the printing processing, the image display processing, and the facsimile transmitting/receiving processing without being limited to the image reading processing. In other words, the present invention can be applied when the content or the number of the setting value or values capable of being set as another setting item (second setting item) differs depending on the setting for the first setting item in which it is possible to set any one of the enabled state and the disabled state as the setting value, of a plurality of setting items in relation to a predetermined processing including, for example, the printing processing, the image display processing, and the facsimile transmitting/receiving processing. The present invention can be applied in the same manner as in the respective embodiments described above, for example, when the setting for whether or not the high quality printing is performed is provided as one of the setting items in relation to the printing processing, and the content or the number of the setting value or values capable of being set as the type of the recording paper differs depending on the concerning setting. In another example, the present invention can be applied in the same manner as in the respective embodiments described above, for example, when the setting for whether or not the high quality display is performed is provided as one of the setting items in relation to the image display processing, and the content or the number of the setting value or values capable of being set as the display resolution differs depending on the concerning setting. In such a case, various apparatuses or devices may be examples of the image forming apparatus, including, for example, the printer, the multifunction peripheral apparatus, the facsimile apparatus capable of executing the printing processing, the smart phone, the mobile phone, PDA, and the tablet terminal capable of executing the image display processing, and the multifunction peripheral apparatus and the facsimile apparatus capable of executing the facsimile transmitting function.

In the respective embodiments described above, the sizes of the manuscript P displayed in the list DL2 when the ADF high speed mode is enabled are the part of the sizes of the manuscript P displayed in the list DL1 when the ADF high speed mode is disabled. However, it is also allowable to adopt such a construction that any size of the manuscript P not displayed in the list DL1, i.e., any size of the manuscript P incapable of being set when the ADF high speed mode is disabled is included as the size of the manuscript P displayed in the list DL2. Further, it is also allowable that the number of the types of the sizes of the manuscript P displayed in the list DL2 is larger than the types of the sizes of the manuscript P displayed in the list DL1.

If the number of the types of the sizes of the manuscript P displayed in the list DL2 is larger than the number of the types of the sizes of the manuscript P displayed in the list DL1, it is also allowable to adopt such a construction that the list DL2 is automatically developed and displayed when the ADF high speed mode is switched from the disabled state to the enabled state, in place of the construction of each of the embodiments described above in which the list DL1 is automatically developed and displayed when the ADF high speed mode is switched from the enabled state to the disabled state. In other words, it is also allowable to adopt the following construction. That is, when the setting of the ADF high speed mode is switched, if the setting is the setting in which the number of the types of the sizes of the manuscript P capable of being set is larger, then the list DL1 or the list DL2, which corresponds to the setting after the switching, is automatically developed and displayed. In such a case, the same or equivalent effect is obtained as the case in which the list DL1 is automatically developed and displayed when the ADF high speed mode is switched from the enabled state to the disabled state in each of the embodiments described above.

Figure 10A:
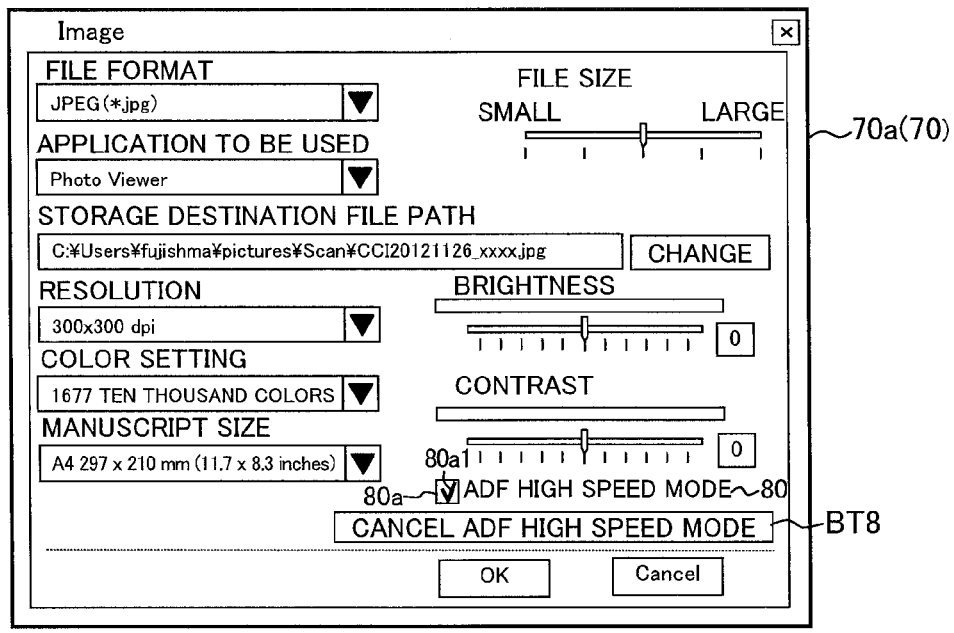
FIGS. 10A and 10B schematically show exemplary setting windows of a modified embodiment.

The respective embodiments described above are constructed such that if the ADF high speed mode is enabled, then the item Q1 is displayed as a part of the list DL2, and the ADF high speed mode can be switched from the enabled state to the disabled state by means of the operation of the item Q1. It is also allowable to adopt such a construction that if the ADF high speed mode is enabled, any other control is displayed in order to switch the ADF high speed mode from the enabled state to the disabled state, in place of the display of the item Q1. For example, as shown in FIG. 10A, it is also allowable that if the check 80a1 is made in the check box 80a, i.e., if the ADF high speed mode is enabled, then Cancel button BT8, which is not displayed when the check box 80a of the setting item 80 is blank, is displayed. Cancel button BT8 has the same or equivalent function as that of the item Q1. When Cancel button BT8 is operated, the ADF high speed mode is switched from the enabled state to the disabled state. In such a situation, the ADF high speed mode, which is in the enabled state, can be also easily switched to the disabled state, in the same manner as the item Q1. Further, it is also allowable to adopt such a construction that the check box, which is provided to switch the ADF high speed mode from the enabled state to the disabled state, is displayed in the setting window 70 when the ADF high speed mode is enabled, in place of Cancel button BT8. In this modified embodiment, Cancel button BT8 and the check box may be examples of the first switching designator. Similarly, it is also allowable to adopt such a construction that any other control, which is provided to switch the ADF high speed mode from the disabled state to the enabled state, is displayed in place of the display of the item Q2, in the second embodiment described above in which the item Q2 is displayed as a part of the list DL1 when the ADF high speed mode is disabled.

Figure 10B:
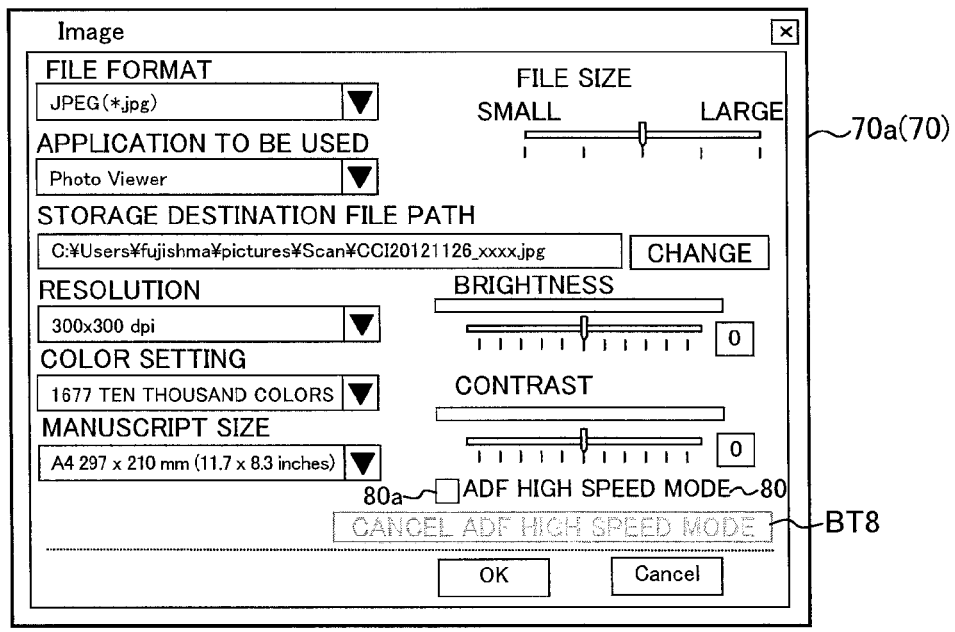

In the embodiments described above, Cancel button BT8, which is provided to switch the ADF high speed mode from the enabled state to the disabled state, is not displayed when the check box 80a of the setting item 80 is blank, i.e., when the ADF high speed mode is disabled. However, it is also allowable that Cancel button BT8 is displayed in a state in which the operation for Cancel button BT8 is disabled. As shown in FIG. 10B, if the check box 80a is blank, Cancel button BT8 is displayed in a grayout state. In other words, if the ADF high speed mode is disabled, the operation for Cancel button BT8 is not accepted. However, if the ADF high speed mode is enabled, the operation for Cancel button BT8 is accepted. Therefore, the user can easily recognize that the ADF high speed mode can be switched from the enabled state to the disabled state.

In the first embodiment, the item Q1, which is provided to switch the ADF high speed mode from the enabled state to the disabled state, is displayed in the list display area 76c formed in the setting window 70 as a part of the list DL2. However, it is also allowable that any control, which has the same or equivalent function as that of the item Q1, is displayed on LCD 18 as a distinct window distinct from the setting window 70. In the respective embodiments described above, all of the sizes of the manuscript P, which constitute the list DL1 or the list DL2, are displayed in one list display area 76c. However, it is also allowable that the sizes of the manuscript P, which constitute the list DL1 or the list DL2, are displayed in one list display area 76c so that the scroll can be performed. In such a case, it is also allowable to adopt such a construction that the item Q1 is always displayed in the list display area 76c even when the sizes of the manuscript P for constructing the list DL2 are scrolled.

In the respective embodiments described above, the respective setting values for the respective setting items displayed in the setting window 70 are decided as the present setting values based on the operation (left-click) of OK button BT5. However, it is also allowable that the setting value after the change is decided as the present setting value every time when the setting value for each of the setting items is changed on the setting window 70, for example, in relation to the operation for the check box 80a. Further, a button for executing the image reading processing may be provided in place of OK button BT5. When the concerning button is operated, then the respective setting values for the respective setting items displayed in the setting window 70 may be decided as the present setting values, and the reading of the manuscript may be instructed to the scanner 30 in accordance with the decided setting values.

The respective embodiments and the modified embodiments are constructed such that CPU 11 executes the respective processings shown in FIGS. 5 to 7 and FIGS. 9A and 9B. However, it is also allowable to adopt such a construction that the respective processings shown in FIGS. 5 to 7 and FIGS. 9A and 9B are executed by a plurality of CPU's in a cooperating manner. Alternatively, it is also allowable to adopt such a construction that single IC or a plurality of IC's such as ASIC or the like executes/execute the respective processings shown in FIGS. 5 to 7 and FIGS. 9A and 9B singly or in a cooperating manner. Further alternatively, it is also allowable to adopt such a construction that CPU 11 and IC or IC's such as ASIC or the like execute the respective processings shown in FIGS. 5 to 7 and FIGS. 9A and 9B in a cooperating manner.

It is also allowable to adopt such a construction that the present invention is carried out by appropriately combining the respective features explained in the first and second embodiments described above and the respective modified embodiments described above.

What is claimed is:

1. A non-transitory computer-readable medium storing computer-executable instructions that, when executed by a processor, cause a control unit of an information processing apparatus provided with a storage unit and configured to be communicable with an image forming apparatus and a display unit to:

display, on the display unit, a setting screen on which setting values for a plurality of setting items are to be set respectively, the plurality of setting items being associated with a predetermined processing to be executed by the image forming apparatus and including a first setting item which has one of an enabled state and a disabled state as a first setting value and a second setting item which has a setting value group, which is associated with the second setting item and stored in the storage unit and which includes a plurality of setting values settable for the second setting item;

display, on the setting screen, a first sub setting value group which is included in the setting value group and which includes a setting value settable for the second setting item under a condition that the first setting value is the enabled state, in a case that the first setting value is the enabled state;

display, on the setting screen, a second sub setting value group in a case that the first setting value is the disabled state, the second sub setting value group being included in the setting value group, and including at least one setting value which is settable for the second setting item under a condition that the first setting value is the disabled state and which is not settable for the second setting item under a condition that the first setting value is the enabled state;

enable an acceptance of an input to a first switching designator for switching the first setting value from the enabled state to the disabled state, in the case that the first setting value is the enabled state; and disable the acceptance of the input to the first switching designator, in the case that the first setting value is the disabled state.

2. The medium according to claim 1, wherein the instructions cause the control unit to:

enable the acceptance of the input to the first switching designator by displaying the first switching designator, in the case that the first setting value is the enabled state; and disable the acceptance of the input to the first switching designator by not displaying the first switching designator, in the case that the first setting value is the disabled state.

3. The medium according to claim 2, wherein the instructions cause the control unit to:

display, in a list display area to be formed on the setting screen, the first sub setting value group together with the first switching designator as a list, in the case that the first setting value is the enabled state; and display the second sub setting value group in the list display area as a list, in the case that the first setting value is the disabled state.

4. The medium according to claim 1, wherein the instructions cause the control unit to:

judge whether the first setting value is switched;

display all of setting values included in the first sub setting value group in an opened dropdown list in a list display area to be formed on the setting screen, in a case that the control unit judges that the first setting value is switched to the enabled state and that the number of setting values included in the first sub setting value group is larger than the number of setting values included in the second sub setting value group; and display all of setting values included in the second sub setting value group in the opened dropdown list, in a case that the control unit judges that the first setting value is switched to the disabled state and that the number of setting values included in the second sub setting value group is larger than the number of setting values included in the first sub setting value group.

5. The medium according to claim 4, wherein the instructions cause the control unit to:

display a setting value which is included in the first sub setting value group and the second sub setting value group in the case that the first setting value is the enabled state, and display all of setting values included in the second sub setting value group in the opened dropdown list, in the case that the control unit judges that the first setting value is switched from the enabled state to the disabled state.

6. The medium according to claim 1, wherein the instructions cause the control unit to:

display, in a list display area to be formed on the setting screen, the second sub setting value group together with a second switching designator for switching the first setting value from the disabled state to the enabled state as a list, and enable an acceptance of an input to the second switching designator, in the case that the first setting value is the disabled state; and disable the acceptance of the input to the second switching designator by not displaying the second switching designator, in the case that the first setting value is the enabled state.

7. The medium according to claim 1, wherein the instructions cause the control unit to:

further display, on the setting screen, a third switching designator for switching the first setting value between the enabled state and the disabled state, the third switching designator being different from the first switching designator;

judge that the first setting value is switched from the enabled state to the disabled state, in a case that an input, to one of the first switching designator and the third switching designator, to switch the first setting value to the disabled state is accepted in a state that the first setting value is the enabled state; and judge that the first setting value is switched from the disabled state to the enabled state, in a case that an input, to the third switching designator, to switch the first setting value to the enabled state is accepted in a state that the first setting value is the disabled state.

8. The medium according to claim 1, wherein the predetermined processing to be executed by the image forming apparatus is a reading processing for generating image data based on a reading of a manuscript by reading elements aligned in a predetermined direction, the first setting item is a setting item in relation to a setting of a placement direction of the manuscript in the image forming apparatus, the enabled state as the first setting value requires that the manuscript is placed on the image forming apparatus so that a longitudinal direction of the manuscript is coincident with an alignment direction of the reading elements, the disabled state as the first setting value requires that the manuscript is placed on the image forming apparatus so that a transverse direction of the manuscript is coincident with the alignment direction of the reading elements, and the instructions cause the control unit to:

judge whether the first setting value is switched between the enabled state and the disabled state; and inform an information about the placement direction of the manuscript corresponding to a case that the first setting value is the enabled, in a case that the control unit judges that the first setting value is switched from the disabled state to the enabled state.

9. The medium according to claim 1,
wherein the predetermined processing to be executed by the image forming apparatus is a reading processing for generating image data based on a reading of a manuscript by reading elements aligned in a predetermined direction, and
in a case that an instruction to start the reading processing is accepted in a state that the first setting value is the enabled state, the instructions cause the control unit to:
judge whether a longitudinal direction of the manuscript placed on the image forming apparatus is coincident with an alignment direction of the reading elements; and
inform an information about a placement direction of the manuscript, in a case that the control unit judges that the longitudinal direction of the manuscript is not coincident with the alignment direction of the reading elements.

10. The medium according to claim 1,
wherein the predetermined processing to be executed by the image forming apparatus is a reading processing for generating image data based on a reading of a manuscript by reading elements aligned in a predetermined direction, and
the second setting item is a size of the manuscript as an objective of the reading processing.

11. An information processing apparatus comprising:
a storage unit;
a communication unit configured to be communicable with an image forming apparatus and a display unit; and
a control unit configured to:
display, on the display unit, a setting screen on which setting values for a plurality of setting items are to be set respectively, the plurality of setting items being associated with a predetermined processing to be executed by the image forming apparatus and including a first setting item which has one of an enabled state and a disabled state as a first setting value and a second setting item which has a setting value group, which is associated with the second setting item and stored in the storage unit and which includes a plurality of setting values settable for the second setting item;
display, on the setting screen, a first sub setting value group which is included in the setting value group and which includes a setting value settable for the second setting item under a condition that the first setting value is the enabled state, in a case that the first setting value is the enabled state;
display, on the setting screen, a second sub setting value group in a case that the first setting value is the disabled state, the second sub setting value group being included in the setting value group and including at least one setting value, which is settable for the second setting item under a condition that the first setting value is the disabled state and which is not settable for the second setting item under a condition that the first setting value is the enabled state;
enable an acceptance of an input to a first switching designator for switching the first setting value from the enabled state to the disabled state, in the case that the first setting value is the enabled state; and
disable the acceptance of the input to the first switching designator, in the case that the first setting value is the disabled state.

12. An information processing method to be executed by an information processing apparatus provided with a storage unit and configured to be communicable with an image forming apparatus and a display unit, the information processing method comprising:
displaying, on the display unit, a setting screen on which setting values for a plurality of setting items are to be set respectively, the plurality of setting items being associated with a predetermined processing to be executed by the image forming apparatus and including a first setting item which has one of an enabled state and a disabled state as a first setting value and a second setting item which has a setting value list, which is associated with the second setting item and stored in the storage unit and which includes a plurality of setting values settable for the second setting item;
displaying, on the setting screen, a first sub setting value group which is included in the setting value group and which includes a setting value settable for the second setting item under a condition that the first setting value is the enabled state, in a case that the first setting value is the enabled state;
displaying, on the setting screen, a second sub setting value group in a case that the first setting value is the disabled state, the second sub setting value group being included in the setting value group, and including at least one setting value which is settable for the second setting item under a condition that the first setting value is the disabled state and which is not settable for the second setting item under a condition that the first setting value is the enabled state;
enabling an acceptance of an input to a first switching designator for switching the first setting value from the enabled state to the disabled state, in the case that the first setting value is the enabled state; and
disabling the acceptance of the input to the first switching designator, in the case that the first setting value is the disabled state.

* * * * *